United States Patent [19]
Baran et al.

[11] Patent Number: 6,094,211
[45] Date of Patent: Jul. 25, 2000

[54] TV AND DATA CABLE SYSTEM INGRESS NOISE BLOCKER

[75] Inventors: Paul Baran, Atherton; George K. Bunya, Morgan Hill; Marshall H. Hollimon, Cupertino; F. Jud Heinzmann, Los Altos, all of Calif.

[73] Assignee: COM21, Inc., Milpitas, Calif.

[21] Appl. No.: 08/699,888

[22] Filed: Aug. 15, 1996

[51] Int. Cl.⁷ .............................. H04N 7/10; H04N 7/14; H04N 5/21; H04N 5/213

[52] U.S. Cl. .................... 348/6; 348/12; 348/13; 348/614; 455/3.1

[58] Field of Search ............................. 455/3.1, 5.1, 501, 455/63, 67.3, 135, 226.3, 296; 348/12, 10, 6, 470, 533, 534, 535, 607, 608, 609, 610, 611, 614, 622; 345/12, 10, 6; H04N 7/10, 7/14, 5/21, 5/213, 5/217

[56] References Cited

U.S. PATENT DOCUMENTS

| | | | |
|---|---|---|---|
| 3,806,813 | 4/1974 | Eller | 325/308 |
| 3,924,187 | 12/1975 | Dormans | 325/52 |
| 4,494,138 | 1/1985 | Shimp | 358/86 |
| 4,520,508 | 5/1985 | Reichert, Jr. | 348/11 |
| 4,530,008 | 7/1985 | McVoy | 358/123 |
| 4,633,462 | 12/1986 | Stifle et al. | 370/85 |
| 4,701,726 | 10/1987 | Holdsworth | 333/185 |
| 4,928,272 | 5/1990 | Ohue | 370/50 |
| 4,982,440 | 1/1991 | Dufresne et al. | 455/4 |
| 5,126,840 | 6/1992 | Dufresne et al. | 358/86 |
| 5,233,418 | 8/1993 | Gumm et al. | 348/6 |
| 5,317,392 | 5/1994 | Ishibashi et al. | 348/6 |
| 5,408,259 | 4/1995 | Warwick | 348/12 |
| 5,499,047 | 3/1996 | Terry et al. | 348/12 |
| 5,561,404 | 10/1996 | Ross | 333/28 |
| 5,585,842 | 12/1996 | Chappel et al. | 348/6 |

FOREIGN PATENT DOCUMENTS

| | | | |
|---|---|---|---|
| 59-161937 | 9/1984 | Japan | H04B 3/32 |
| 60-171884 | 9/1985 | Japan | H04N 7/173 |
| 63-123239 | 5/1988 | Japan | H04L 5/14 |
| 2255698A | 11/1992 | United Kingdom . | |
| WO9624207 | 8/1996 | WIPO . | |

OTHER PUBLICATIONS

Roger Brown, Poised for Competition in California, CED Magazine, p. 5, Aug. 1995.

Thomas Staniec, Making It Work: Return Systems Successful Interactivity 101, CED Magazine, pp. 66–72, Aug. 1995.

Leslie Ellis, Pacbell Defends Hybrid Fiber/Coax: 'Right Technology at Right Price', Broadband Week, pp. 33–35, Jul. 3, 1995.

Primary Examiner—Andrew I. Faile
Assistant Examiner—Vivek Srivastava
Attorney, Agent, or Firm—Allston L. Jones

[57] ABSTRACT

This invention permits the upstream transmission of short packets of information in a cable TV system, and blocking upstream noise at all other times, and does so without interfering with image quality of normal TV viewing. A remotely operable ingress noise blocking filter is placed at the terminating junction between a subscriber's coaxial drop cable and a corresponding feeder tap in a cable TV system. The ingress noise blocking filter contains a high pass filter to pass the normal TV band. This high pass filter is bypassed by a section containing low pass filters and a switch operated when receiving a control signal from a cable modem during those short durations the cable modem is authorized to transmit an upstream signal. Low pass filters isolate the switching elements so that switching transients cannot occur in the downstream TV band. The level of the amplitude of the downstream signal is unaffected whether the switching elements are open or closed. Further, the switching arrangement provides a relatively constant impedance, both when the switching element is on and off to provide a high return loss and avoid signal reflections and maintain signal quality. In a diagnostic mode, the location of each noise source is determined by correlating the energy measured at each a set of frequencies across the band at the headend during those periods when the cable modem is allowed to transmit versus the energy received during those periods when the same cable modem is not authorized to transmit.

25 Claims, 12 Drawing Sheets

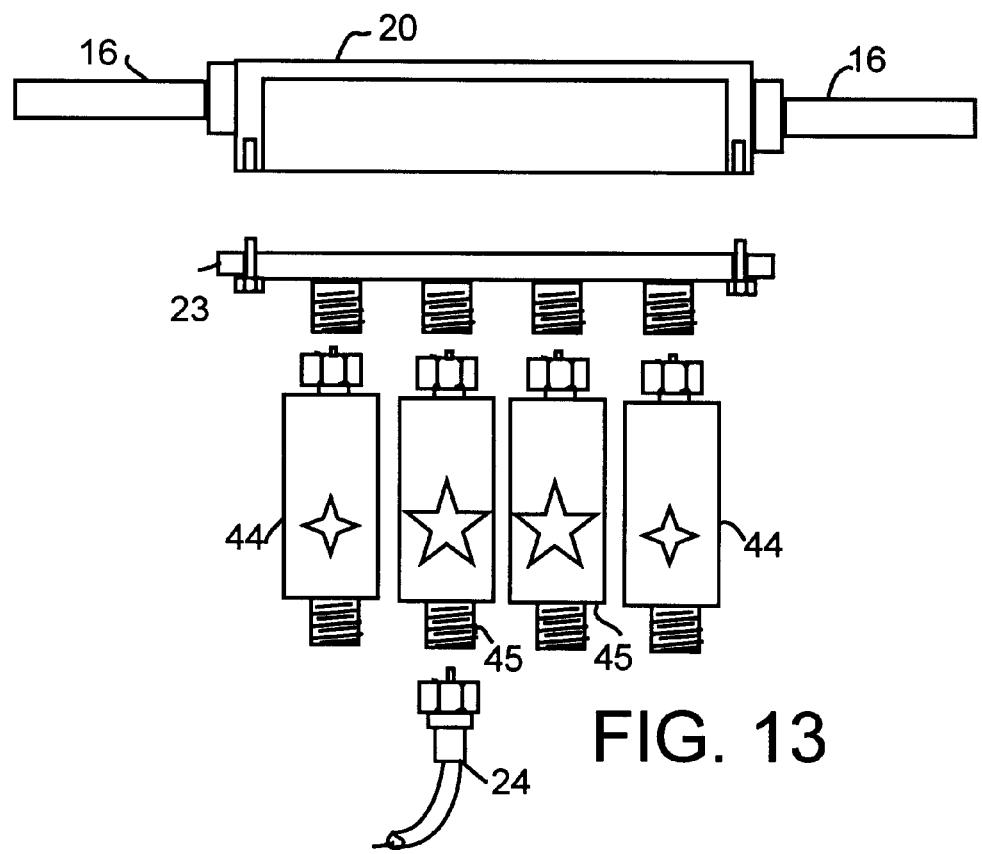
FIG. 13
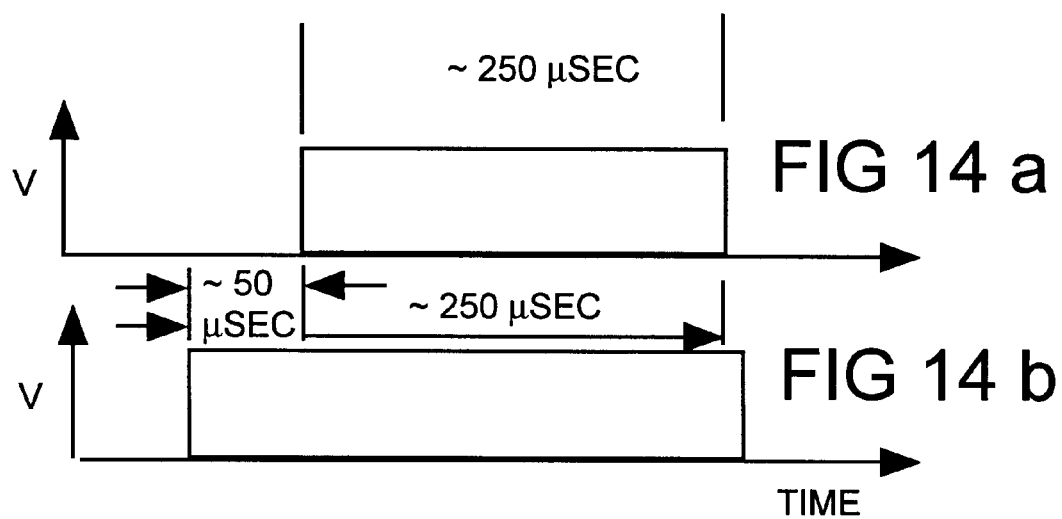
FIG 14 a
FIG 14 b

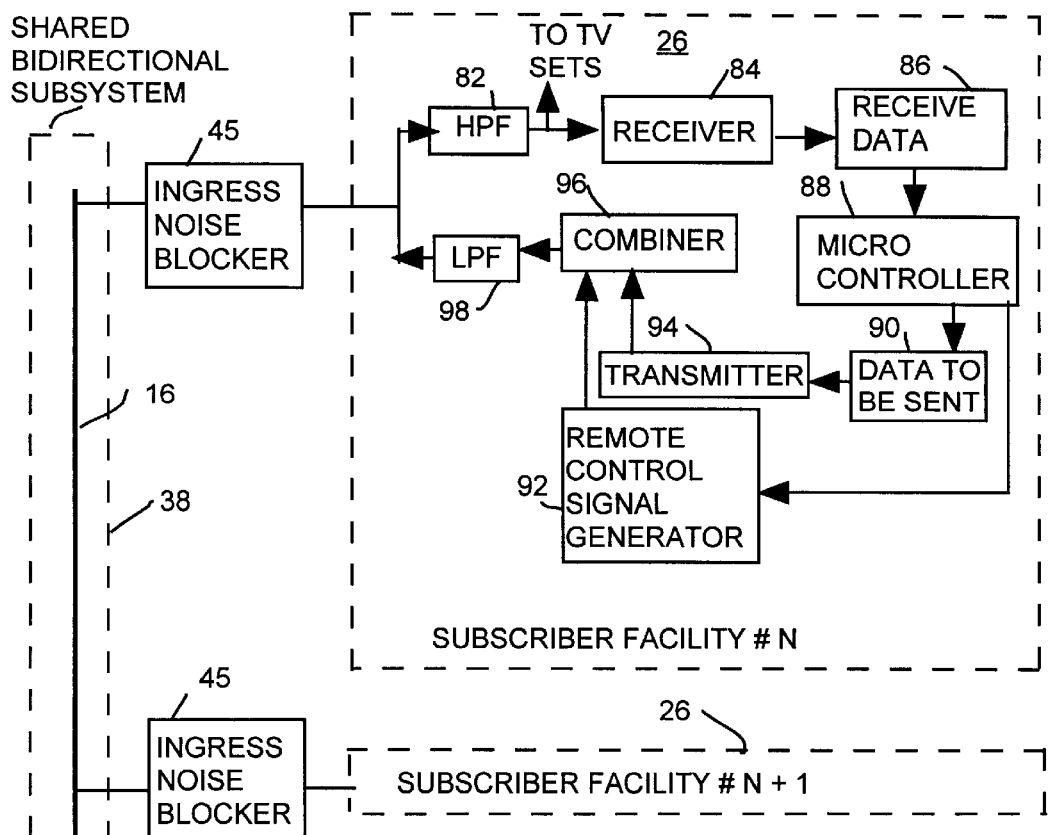
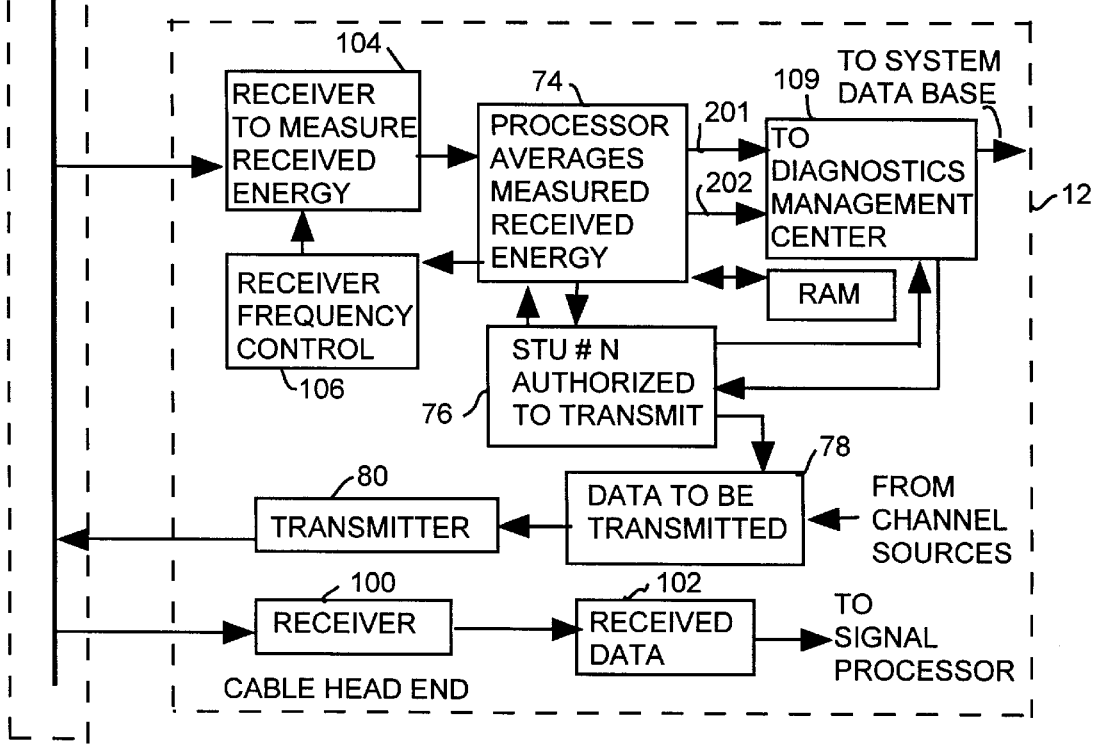
FIG. 16

TV AND DATA CABLE SYSTEM INGRESS NOISE BLOCKER

FIELD OF THE INVENTION

This invention relates to two way TV cable systems transmitting digital signals using cable modems in general, and to blocking and locating upstream ingress noise in specific.

BACKGROUND OF THE INVENTION

Limitation On Two Way Use Of Cable Systems

TV cable modems operate in a hostile signal environment as the upstream cable channels are subject to generally uncontrollable ingress noise. Careful plant maintenance is needed to minimize the error causing effects of such noise. Many older cable systems are regarded as being unacceptable for reliable two-way transmission because of the cumulative noise level, and the lack of an easy way to determine the source of such noise necessary to correct its cause.

The Basic Problem

In the downstream direction, cable systems are similar in operation to a water distribution system with water flowing under pressure splitting into a myriad of smaller and smaller pipes to reach each house. In the reverse direction cable systems have been described as being similar in operation to a sewage system where each house contributes to a common flow gathered together by the system to reach the headend. Pollution from any single house can thus poison the common upstream channel for all subscribers in that accumulating path. Once polluted, discovering the source of that pollution is a highly manual labor intensive effort.

What is The Source of The Noise?

About 75% to 80%, or more, of the upstream noise is said to be generated within the houses themselves. Another 15% to 20% is attributable to the low-cost, flexible drop cables using inexpensive F-connectors that connect the houses to taps on the solid aluminum sheathed feeder cables passing the houses parallel to the street. While essentially all upstream noise originates from locations other than the feeder cable, a small amount of the noise is found to come from the feeder cable portion of the cable system. In practice, this small percentage of leakage into the feeder cable system is relatively easy to control. The FCC requires periodic leakage monitoring. To do so, a technician in a vehicle, having a radio receiver, listens to a cable frequency while driving along the street parallel to the feeder cable. Egress and ingress are two manifestations of the same phenomenon, and proportional to one another. Therefore, when easy-to-locate outgoing leakage is detected and corrected, the ingress at the same location, having been permitted by the same mechanism, is also cured.

The predominant noise sources are generally within the subscriber's house, where service access is often difficult. The in-house location of the noise is beyond the regulatory demarcation point of the cable franchise holding company, adding to the difficult task of locating and correcting sources of the noise within a subscriber's premises. The cause of the noise can be as varied as do-it-yourself cable wiring, light dimmers, universal electric motors with sparking brushes, poor electrical power wiring and inadequate grounding within the subscriber's premises. Thus, the major cause and location of noise in the short term is beyond the control of the cable company. This makes rapid detection and correction of the noise of the common polluted channel difficult. Further, even scheduling home visits to track down noise are increasingly difficult in a era when both spouses are away at work. This problem is compounded further in that the noise is often intermittent (e.g., present only when a vacuum cleaner is in use or a light fixture operated with a dimmer switch is on).

Need for More Robust Modulation

A heavy, but often unappreciated price, is already being paid by the cable industry in coping with limitations of the upstream channel. For example, the cable industry has tentatively chosen to use QPSK modulation in the upstream direction. QPSK modulation has only about two thirds of the data carrying capacity as the preferred standard downstream 64-QAM modulation. In other words, one-third of the potential upstream bandwidth capacity is the price paid to be able to better live with upstream noise.

Reduction In Number Of Houses Passed Per Channel

Another high price being paid is the necessity of reducing the number of houses connected to a common cable. Fiber optic cables must be extended further and further into the cable plant, to join the coaxial tails to correspondingly reduce the number of cable line amplifiers and houses connected on any single upstream channel, to correspondingly reduce the likelihood of ingress noise. For example, when the number of houses per upstream channel is reduced to 500 from 5,000, the probability of noise from any single house destroying the common channel is reduced by a factor of ten. While an excellent partial solution, the chance of encountering a noisy house that can bring down the entire system remains a significant risk factor.

Necessity for Dealing with Legacy Systems

The legacy cable systems in use today have all been designed to use the spectrum below TV Channel 2 (i.e., 5–42 MHz), for upstream transmission. In retrospect, this has been a poor choice of frequencies because of the ingress noise problem. What is needed is a viable approach to minimize ingress of noise to allow the effective use of this band for upstream transmission. The specific problem addressed by the inventors is the better commercial utilization of the 5–42 MHz band (particularly the 5 to 20 MHz portion of that band), so prone to short wave radio signal pickup, power line transients, harmonics and impulse noise.

PRIOR ART

Use Of High Pass Filters

The use of high pass filters to block low frequency ingress noise is old art. Small high pass cylindrical filters having axial F-connectors are sometimes used in cable systems to block the 5–42 MHz range. Such filters are inexpensive, costing as little as two dollars each in very large quantities. These filters are often mounted at the cable modem, and sometimes before the first splitter, at the junction of the drop cable entering the house, or at the tap. Such filters are preferentially mounted at the feeder taps so as to block upstream noise generated either in houses, and ingress noise entering the system via a damaged drop cable or F-connector.

Limitation

While the use of such conventional high pass filters is well known in the art to effectively block noise coming from houses having TV sets, a different arrangement is needed to serve those houses that have a two-way cable modem that must transmit signals upstream. Thus, a "smart" filter arrangement is desired to allow remote connection in synchronism with data to be transmitted upstream. There are several patents addressing this general problem, but a number of practical feasibility issues, described below, have limited success in those approaches to date. Below, in chronological order, is a discussion of selected patents that provide a history of what has been done to date, and the shortcomings of those approaches to help identify the uniqueness of the present invention and the problems it solves.

Dormans, in U.S. Pat. No. 3,924,187, issued Dec. 2, 1975, describes the controlling of signal gates in series with the upstream paths to reduce the combined noise from a large number of subscribers. These gates timeshare the upstream channel wherein each subscriber transmits during a predetermined time interval following a master reference signal. Switching takes place at the bi-directional amplifier locations, where upstream and downstream signals are separately available. Dormans describes switching off feeder transmission legs to prune out inactive portions of the network, implicitly at the network bridger points. Dormans discusses two implementations. In one, command receivers are used to decode the control information from the headend. In another implementation, a control signal comes from the subscriber, in the form of composite upstream data and pilot tone, with both components being required to be present within a narrow band to open the bridger gate. Dormans major contribution is in the teaching of the concept of a bridger switching control in the upstream channel.

Andou, in Japanese Pat. No. JA 59-161937, issued Sep. 12, 1984, describes the prevention of noise buildup in the transmission of upstream video signals by first rectifying the upstream video signal to create a control signal. Then Andou uses that control signal to enable a switch in the upstream direction. Implicitly, this invention performs the filtering and switching function at the bi-directional amplifier location where the upstream and downstream signals are each separately available. The objective of the gating is to prevent noise buildup from many separate subscriber facilities by not sending upward any signal other than a clearly valid waveform. This implicitly assumes that the undesired noise has a lower amplitude than the signal, (i.e. a random Gaussian type noise). While this is certainly one component of noise of concern, Andou does nothing to handle ingress noise of greater magnitude than the signal itself that is the greatest threat in bringing down the channel.

What Geshi, in Japanese Pat. No. JA 60-171884 issued Sep. 5, 1985, discusses is somewhat similar to what Andou discussed, however Geshi instead of using a switch at the amplifier location accepts the upstream signal via a band pass filter and then frequency shifts the upstream signal. The same differences and limitations apply to this approach as discussed above in relation to the Andou approach.

What Yamazaki, in Japanese Pat. No. JA 63-123239 issued Jul. 27, 1988, discusses is similar to what Andou and Geshi both discuss with the difference being that Yamazaki detects the upstream signal and then re-modulates that signal to develop a new noise reduced upstream signal.

Ohue, in U.S. Pat. No. 4,928,272, issued May 22, 1990, teaches the use of transmuxiplier converters at the branching junctions of the cable system to convert upstream frequency division signals into time division signals. The objective here is to be able to use bridger gates that switch in the time domain thus letting signals from each branching trunk to be sent upstream separately and sequentially so that only one noise source at a time is connected in the upstream direction. This use of bridger switching to reduce noise is limited if the upstream signals are frequency division multiplexed. In this case, conversion from frequency division into time division signals is not applicable if there are multiple frequency division signals present.

Dufresne et al., in U.S. Pat. Nos. 4,982,440 and 5,126,840 issued Jan. 1, 1991, and Jun. 30, 1992, respectively, the latter being a divisional of the former, like the previously described patents, seeks to reduce the upstream noise level from a large number of multiple sources as "It has been found that excess noise in the upstream direction can overload the upstream portion of the bi-directional amplifiers, which can cause oscillation in the bidirectional amplifiers in the trunk and/or the distribution lines."

To reduce upstream noise Dufresne offers a number of options. The first, is the use of very narrow band pass filters to pass only the expected upstream signals. The second is to use a gate, together with very narrow band filters wherein, if and only if, the energy in each passband is greater than a threshold, the upstream gate is opened. In another embodiment, a pilot tone is also sent. Here, if and only if the pilot tone and a signal are both present does the upstream switch open. And in yet another embodiment, the gates can be opened and closed selectively by signals received from the headend with each switch having a separate address.

SUMMARY OF THE INVENTION

The present invention provides a plurality of "smart filters", which herein are called "ingress noise blockers" that connect each TV household to the cable and are located at feeder tap locations wherein each such smart filter blocks ingress energy in the upstream band, except for those exact instants when it is necessary to transmit upstream signals from a specific house.

The present invention also pinpoints the sources of ingress noise. Since 75% to 80% of the interference is said to be generated within the cable subscriber's facilities themselves, pinpointing noise today is a time-consuming, difficult, labor-intensive effort but is the only option now available. The noise source can be from any facility whether or not a data transmission is occurring at the time the noise is occurring. The present invention ingress noise blocker blocks the transmission of all upstream signals from each facility except when the headend authorizes a particular facility to transmit. Conventional high pass filters are used on the drop cables for all downstream-signal-only subscribers so that ingress noise is blocked from all sources except from the facilities of those subscribers who require two way transmission, and then only during those short intervals when data is actually being transmitted by that subscriber's modem. In modern two-way cable systems, upstream transmission is generally in the form of short high data rate bursts, or packets. It is also important that the switching process not cause visible impairments in the higher frequency TV signals.

The present invention uniquely prevents loss of picture quality in part by placing the switching element buffered by low pass filters to block all energy in the TV band.

Additionally, the present invention ingress noise blocker is small enough to be packaged to fit current feeder taps. TV cable feeder taps are generally manufactured in the form of die cast housings connected in line with a solid sheathed feeder cable. The typical tap is built with a removable face plate. The ingress noise blocker can also be packaged to fit into such a typical exchangeable face plate assembly to reduce cost and simplify installation.

Another feature of the present invention is to pinpoint the location of noise. This is done by correlating the noise received at the cable headend during that time interval each modem is authorized to transmit. If a correlation is found, then it is inferred that the source of such noise ingress is coming from the facility containing the modem authorized to transmit, at those exact instants corresponding to the noise being received. Thus, correlating the frequency and time patterns determines the location of the ingress noise, and the location and possible cause of the noise.

The present invention also permits the use of a simple remote control signal circuit arrangement to allow a simple retrofit of existing TV cable modems to provide the necessary ingress noise blocker activating signal.

BRIEF DESCRIPTION OF THE DRAWINGS

This invention may be better understood by reference to the following drawings;

FIG. 13 is a modified version of FIG. 3 including both high pass filters and ingress noise blockers to accommodate cable system subscribers who have purchased different services.

FIGS. 14a and 14b are timing diagrams showing a transmitted packet time interval and the use of a precursor initiated remote control signal.

FIG. 16 is a block diagram of the system arrangement used to pinpoint the location of the source of ingress noise.

DETAILED DESCRIPTION OF THE PRESENT INVENTION

Figure 1:
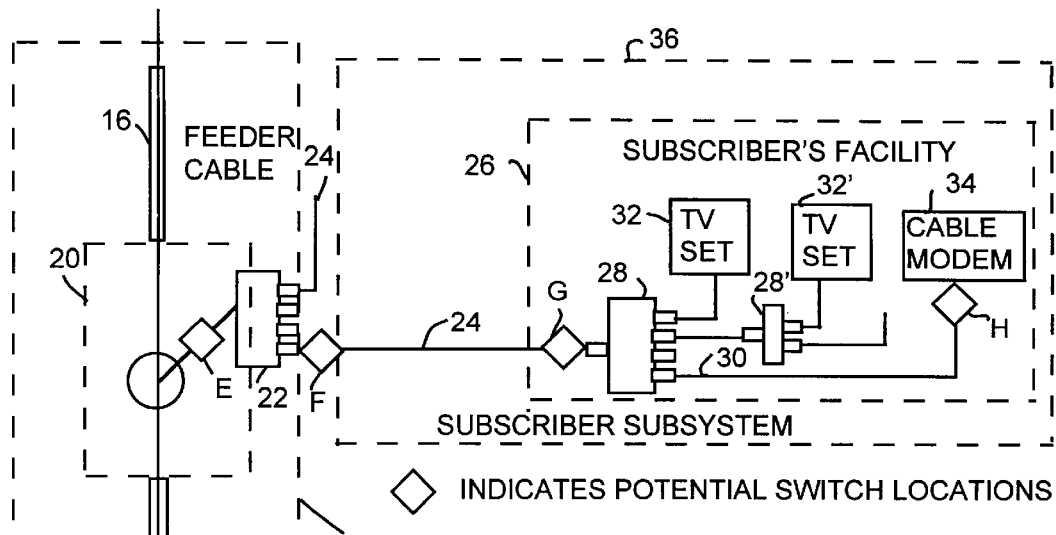
FIG. 1 is a simplified schematic view of the prior art TV cable system showing sources of ingress noise and potential locations where high pass filters can be, or have been, used in the past.

FIG. 1 is a simplified schematic of the downstream portion of a TV cable system of the prior art. The upstream headend 12 of the system provides a downstream signal, via a feeder cable 16 to one or more bridger amplifiers 14 from which a plurality of branching trunks emanate, each carrying the signal feed from headend 12 to a continuing feeder cable 16, 16', 16", etc. Then, at selected intervals along feeder cable 16 there are bi-directional amplifiers 18 to boost the signal level as it travels further from headend 12 and as signals are split off via feeder taps 20 to one or more subscribers and for the upstream signal return on feeder cable 16. Connection between feeder tap 20 and each subscriber's in-facility wiring 30 is accomplished with a drop cable 24 that is connected between splitter 22 of feeder tap 20 and splitter 28 within the subscriber's facility 26. Then from splitter 28 the subscriber's facility 26 is wired with coaxial cable 30 to connect to one or more TV sets 32, perhaps a cable modem 34 and a secondary splitter 28' to which other TV sets and other devices may be connected. The common shared portion of the cable system, for convenience in further discussion, is called a "shared bidirectional subsystem" 38 and the portion unique to each subscriber facility is called a "subscriber system" 36.

As discussed above, noise in the upstream direction is a serious problem because each subscriber facility passed by feeder cable 16 adds some upstream noise. Additionally, the upstream transmission from subscribers is in the 5 MHz to 42 MHz band. The use of that band for upstream transmissions is susceptible to noise ingress from a large number of low frequency noise sources, such as electric motors, high frequency radio broadcasting, etc., many of which are present in residential structure electrical power wiring sharing a grounding wire with the TV cable equipment. Additionally, poorly installed connectors and shielding breaks at splitters 28 and 28' and in drop cable 24 also provide points of noise ingress, as do improperly installed connectors attached to splitters 22 of feeder tap 20.

Thus, as upstream noise is to be minimized, a switching arrangement for the 5 MHz to 42 MHz frequency band is necessary since the noise sources can not easily be found and removed. Locations for such band switching could be provided at any of various locations in the typical TV cable system as shown in FIG. 1. Those locations are illustrated with diamonds A–H. Locations A, B and C being shown in the three branching trunks of bridger amplifier 14; D in each of bi-directional amplifiers 18; E in each tap path of each feeder tap 20; F and G at either end of each of drop cables 24; and H at the output terminal of the subscriber cable modem 34.

Since 75% to 80% of the ingress noise is contributed by sources in or around the subscriber's facility 26, a switch in the upstream direction on the output of cable modem 34 would eliminate the majority of that noise ingress, provided that the subscriber has such a modem. However, if the subscriber does not have a cable modem, noise is just as likely to be contributed from those sites, so it is desirable that high pass filters without switches be used at such subscriber facilities. Locations A through D would cover both types of subscribers, those with and those without cable modems 34 (i.e., those with and without upstream transmission capability), as well as picking up additional noise suppressions for that 15% to 20% of noise contributed by drop cable 24, but this not only disconnects a single subscriber facility or a few subscriber facilities, but rather large sections of the cable system and are hence less desirable than disconnecting only one or a few subscriber facilities.

However, as described above, a leaky junction or feeder cable 16 is easy to identify by well known drive-by techniques. This is done by identifying points using a radio receiver where a downstream signal leaks out. If a downstream signal leaks out, then it is a likely ingress point of upstream noise. As will be seen from the following discussion, the advantages of locating a noise blocking device of the present invention at location F is the ability to single out which subscriber is contributing the unwanted noise with little additional ingress compared to locations A to E. Thus, to retain that added advantage, as well as suppressing the greatest amount of downstream noise, location F is chosen as the optimum location for the ingress noise blocker of the present invention. It should be noted that location E would be nearly as advantageous. The problem of locations H and G is that they allow ingress leakage if drop cable 24 or its connectors are defective.

Figure 2:
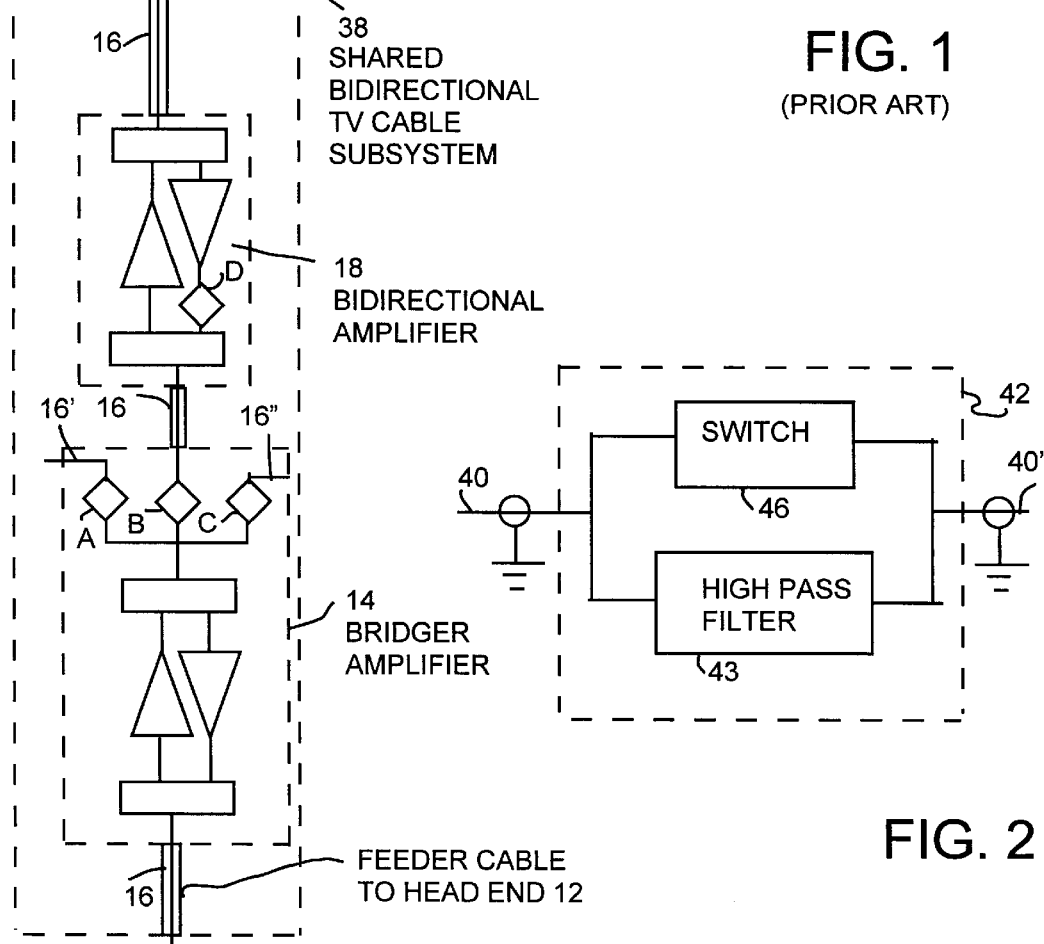
FIG. 2 is a simplified schematic showing the basic concept of bypassing a high pass filter to allow transmission of upstream signals.

FIG. 2 is a simplified schematic showing the basic concept of a switched upstream noise blocker 42 that includes two sections. A high pass filter section 43 with a switch section 46 connected in parallel with high pass filter section 43 to allow the transmission of upstream signals when switch section 46 is conductive, thus bypassing high pass filter 43. In simplified terms, high pass filter 43 is provided to pass downstream signals from headend 12 to each subscriber via connectors 40 and 40', while switch 46 is provided to bypass high pass filter 43 when a subscriber has an upstream signal to transmit to headend 12. Thus, if switched filter 42 is located at any of points A, B, C, D or E, switch 46 needs to be conductive whenever any subscriber downstream from that point is sending information upstream to headend 12; whereas if switched filter 42 is located at point F, G or H, switch 46 only needs to be conductive when a single subscriber downstream from, or at that location, is sending information upstream to headend 12. While the concept of FIG. 2 is correct, switch 46 causes interaction with the high pass filter 43. This must be removed as discussed below.

In practice the frequency band of 5–42 MHz is used for upstream transmission.

Figure 3:
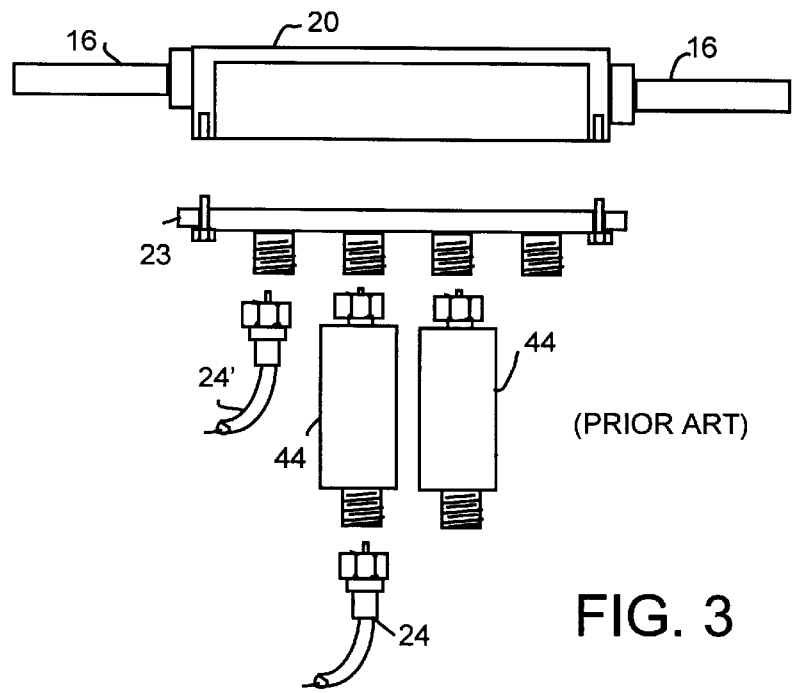
FIG. 3 is a pictorial sketch showing conventional high pass filters of the prior art connected to the feeder tap drop cable to block upstream noise.

FIG. 3 illustrates the prior art implementation of the discrimination between subscribers that have downstream service only, as opposed to subscribers that have both downstream and upstream service. In the top portion of FIG. 3 there is an exploded view of a feeder tap 20 connected serially between two portions of feeder cable 16 with connector base plate 23 shown separated from feeder tap 20. Then, in the lower portion of FIG. 3 there is shown an exploded view of connector base plate 23 and the connection of various subscriber drop cables 24 and 24' thereto. For subscribers who have only contracted for the basic downstream service, a cylindrical removable high pass filter 44 is connected serially between one of the connectors on base plate 23 and the drop cable 24 that connects to that subscriber's facility 26. Similarly, for full service subscribers in prior art systems, the high pass filter 44 is omitted and that subscriber's drop cable 24' is connected directly to a connector on base plate 23.

Figure 4:
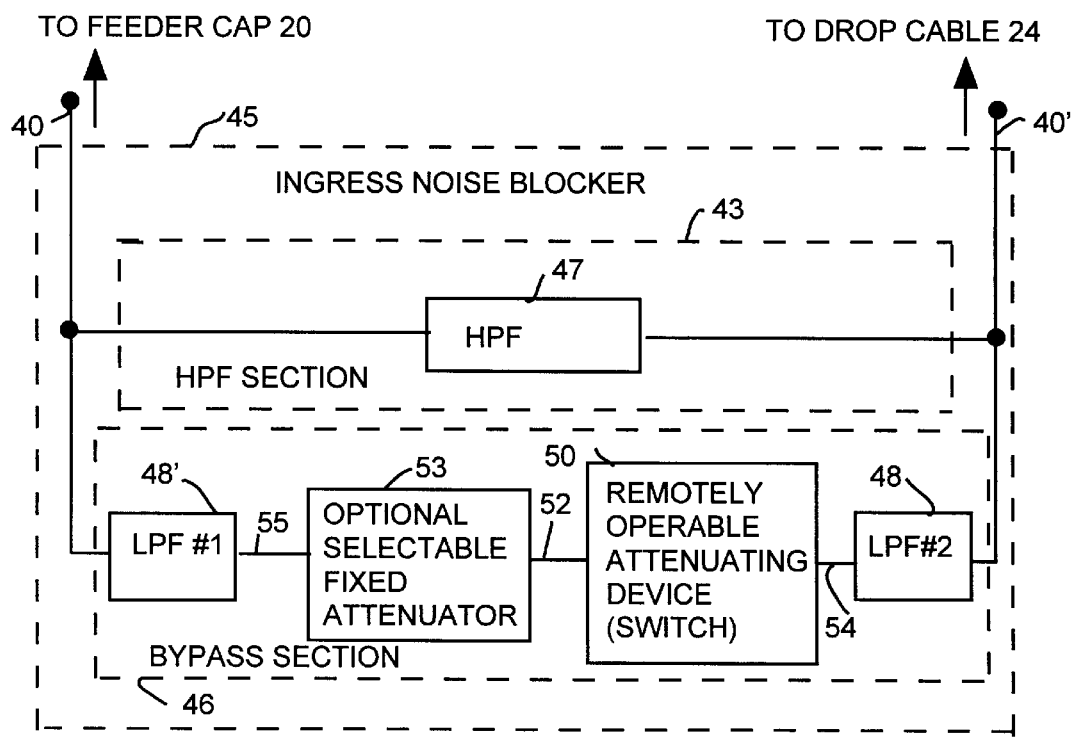
FIG. 4 is a block diagram of the ingress noise blocker of the present invention.

FIG. 4 is a block diagram of an ingress noise blocker 45 of the present invention that is shown in more detail than the general block diagram of FIG. 2 with the reference numbers for the similar sections carried over to FIG. 4. In actual operation, ingress noise blocker 45 is connected serially between a feeder tap 20 via connector 40 and a drop cable 24 via connector 40'. Internally between connectors 40 and 40' are the two parallel connected sections: high pass filter section 43 and switch section 46 as in FIG. 2. High pass filter section 43 includes a high pass filter 47 that is designed to pass downstream TV signals in the frequency range above 50 MHz. Similarly, bypass section 46 consists of three or four serially connected elements (one being optional): a first low pass filter 48' having one terminal connected to connector 40 and a second terminal connected to line 55; a second low pass filter 48 having one terminal connected to connector 40' and a second terminal connected to line 54; a remotely operable attenuating device 50 (essentially a set of switches as discussed below) having one terminal connected to second low pass filter 48 via line 54 and a second terminal connected to line 52; and an optional selectable fixed attenuator 53 connected between lines 52 and 55 (i.e., if attenuator 53 is not present lines 52 and 55 are the same line). In bypass section 46, each of low pass filters 48 and 48' are designed to pass upstream signals in the 5 MHz to 42 MHz band, as well as below 5 MHz, and they do so when a corresponding subscriber's cable modem 34 sends a remote control signal to remotely operable attenuating device 50 as described in detail below.

Figure 5:
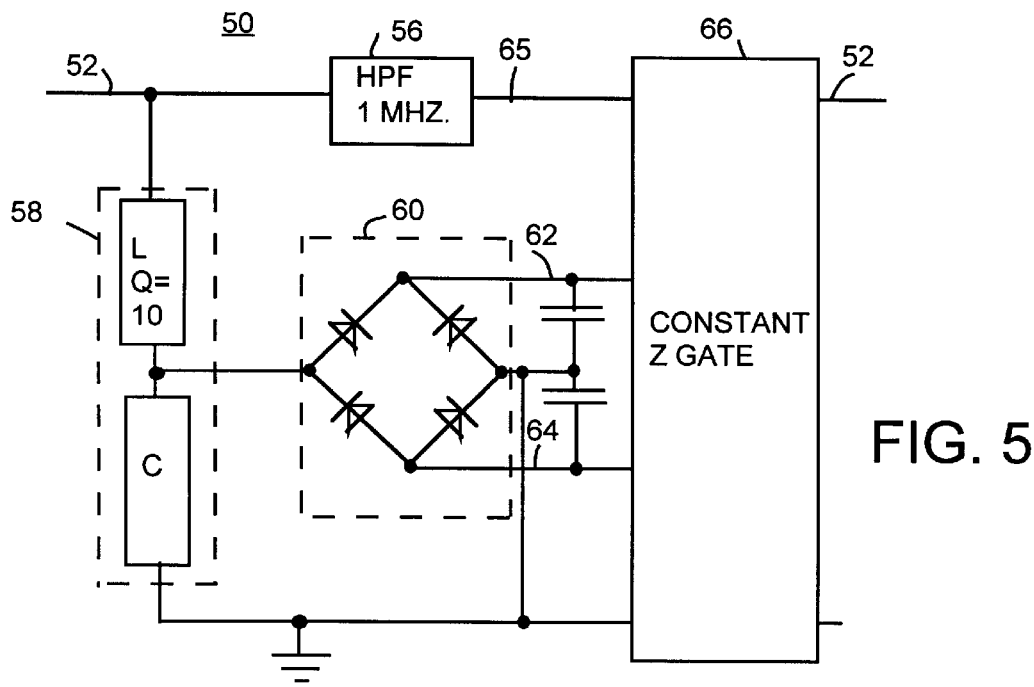
FIG. 5 is schematic block diagram of the switching circuit of the ingress noise blocker of FIG. 4.

Referring next to FIG. 5, there is a block diagram representation of remotely operable attenuating device 50. Before discussing the components and their interconnection as shown in FIG. 5, the technique that is preferred for the present invention to activate remotely operable attenuating device 50 is to have the subscriber's cable modem 34 to initiate a tone at a frequency below the lowest upstream data frequency preceding the data packet to be sent upstream with a remote control signal and terminating concurrent with or following the end of the data packet. One such technique is to add a 1 MHz tone that begins ahead of the data packet, with that 1 MHz tone being received by and activating remotely operable attenuating device 50 sufficiently ahead of the upstream packet for any switching transients to dampen out.

Figure 19:
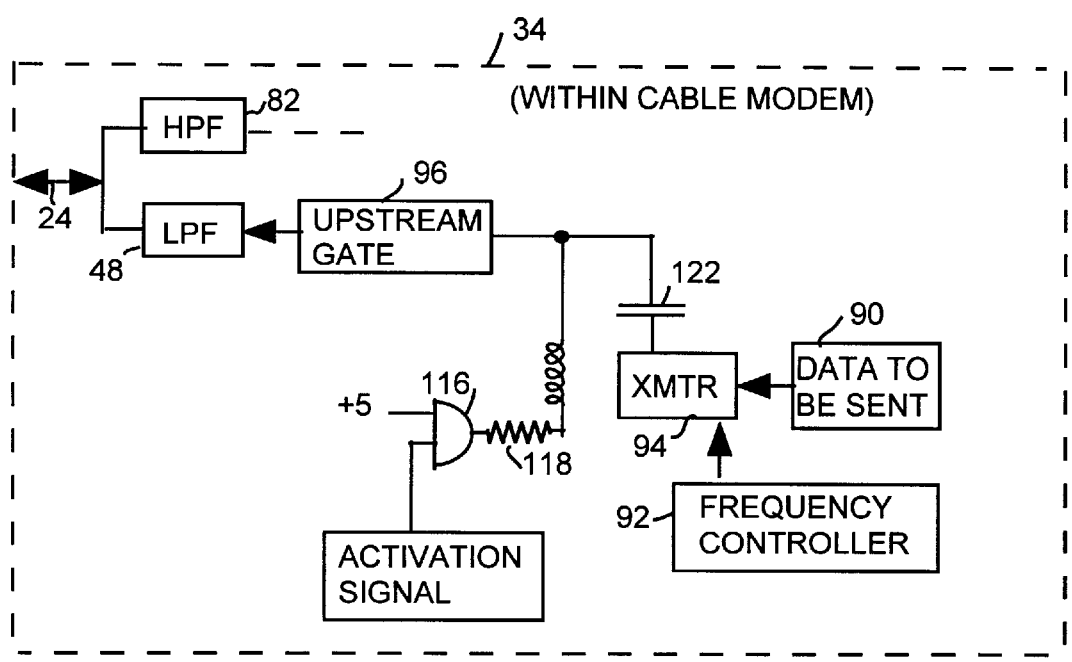
FIG. 19 is a schematic diagram similar to FIG. 18 with a DC voltage source replacing the AC source of FIG. 18.

In a second embodiment, as shown in FIG. 19, a DC signal is used instead of the 1 MHz tone. This technique is discussed further below.

As shown in FIG. 5, the remote control signal from the subscriber's cable modem 34, after it pass through second low pass filter 48, is applied to remotely operable attenuating device 50 on line 54. Line 54 in turn is connected within remotely operable attenuating device 50 to resonant tuned circuit 58 and a high pass filter 56 with a lower cut-off frequency that is above 1 MHz and below 5 MHz. Thus, resonant tuned circuit 58 consisting of a series connected inductor and capacitor with the amplitude of the voltage at the junction point between the inductor and capacitor amplified by the Q of the resonant circuit. If a Q of 10 is used then the gain factor is about 10 presenting a signal that is large enough to be rectified by a rectifier 60 to produce a positive voltage output on line 62 and a negative voltage output on line 64. The DC voltage between lines 62 and 64 in turn powers a constant impedance gate arrangement 66 as is discussed below. Resonant circuit 58 also acts as a tuned trap, removing most of the energy across its terminals so that there is very little signal that must be blocked by high pass filter 56.

In addition, the upstream leakage of the remote control signal is minimized by high pass filter 56 that serves to pass only energy above that of the 1 MHz frequency tone. However, high pass frequency 56 has a low enough cut-off frequency to pass the upstream data packet modulated at a frequency in the 5 MHz to 42 MHz upstream signal band.

Thus, when the data packet follows the remote control signal that signal is passed through high pass filter 56 and provided to gate 66 on line 65. The upstream data packet then passes through gate 66 which continues to maintain a path therethrough for at least the duration of the data packet. Leaving gate 66, the upstream data packet proceeds on line 52 (referring now to FIG. 4) to attenuator 53 (if present) and then through the first low pass filter 48' to connector 40 and on to drop cable 24 (not shown).

Figure 6:
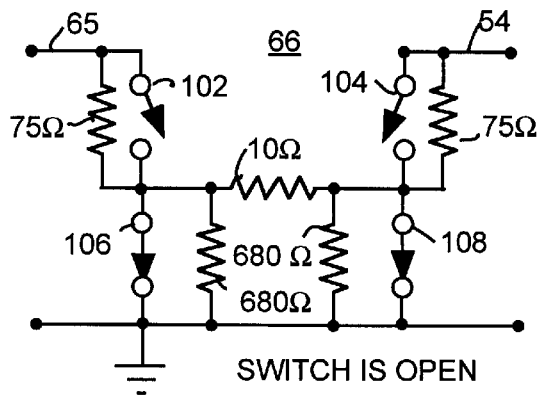
FIG. 6 is a schematic diagram of the impedances presented when the switching circuit of FIG. 5 is open.
Figure 7:
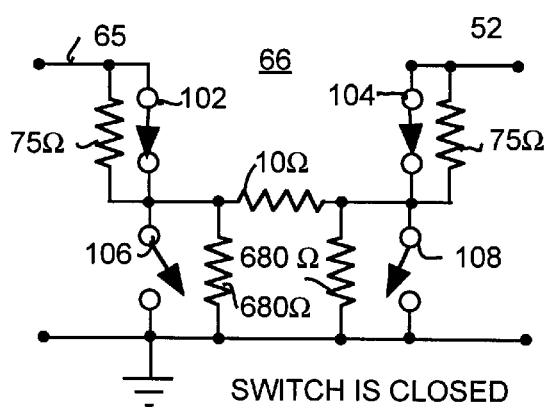
FIG. 7 is a schematic diagram of the impedances presented when the switching circuit of FIG. 5 is closed.

FIGS. 6 and 7 illustrate the structure and operation of constant impedance gate 66 of FIG. 5 and therefore should be viewed together, as they illustrate the two conduction states of gate 66. Given that in the subscriber subsystem of TV cable systems the various elements are terminated in 75 ohms, as first and second low pass filters 48' and 48 would be, gate 66 is designed to retain that nominal impedance (gate 66 can be designed to match any selected termination impedance). Here, the two low pass filters 48' and 48 are each terminated into 75 ohms, their nominal impedance.

In FIGS. 6 and 7 gate 66 is depicted as a two-tier, four switch combination that retains a 75 ohm termination to both lines 65 and 54 whether gate 66 is conductive or nonconductive of the upstream packet signal. In the upper tier, connected to each of lines 65 and 54, are a pair of 75 ohm impedances each with an upper tier switch 102 and 104, respectively, connected across the 75 ohm impedances. Additionally, there is a 10 ohm impedance serially connected between each 75 ohm/switch combination. In the lower tier there is also a pair of switches/impedances parallel combinations with lower tier switches 106 and 108 across 680 ohm impedances connected between each end of the 10 ohm impedance and ground.

FIG. 6 illustrates the normally unenergized state of gate 66 with each of switches 102, 104, 106 and 108 without power being applied to gate 66 from rectifier 60 (see FIG. 5) before the remote control signal (1 MHz tone in this embodiment) is received. In this unenergized state, upper tier switches 102 and 104 are open, and lower tier switches 106 and 108 are closed. Thus, a 75 ohm termination impedance is provided to each of lines 65 and 54 to ground through closed switches 106 and 108, respectively.

Alternately, when a remote control signal has been received and gate 66 has been activated, each of switches 102, 104, 106 and 108 are energized and change state from the state for each shown in FIG. 6. Thus, in FIG. 7 there is a signal path provided between lines 65 and 54 via the closed upper tier switches and serially connected 10 ohm impedance, with that signal path isolated from ground by open lower tier switches 106 and 108 together with the 680 ohm impedances to ground. Thus, in the conductive mode, gate 66 provides a low impedance connection, on the order of 10 ohms, between the first and second low pass filters 48' and 48 with a relatively high impedance to ground by through the two parallel 680 ohm impedances to ground. Therefore effectively connecting the first and second low pass filters 48' and 48 together to provide the optimum impedance and low attenuation for passage of the upstream data packet.

In FIG. 6, gate 66 is non-conductive and in FIG. 7, gate 66 is conductive. Thus, when implemented with a semiconductor gate, the gates corresponding to switches 102 and 104 (e.g., 2N7002) would be normally open, while the gates corresponding to switches 106 and 108 (e.g., sections of an SW239 switch) would be normally closed. Then when the control signal is received by remotely operable attenuation device 50, thus activating rectifier 60 and then powering the gate equivalents of switches 102, 104, 106 and 108, gate 66 switches to the conductive mode. Any switching transient that may be presented by gates 102 through 108 that is blocked by low pass filters 48 and 48' in ingress noise blocker 45 of the present invention. It is important to suppress switching transients in the TV band since they could cause visual artifacts as the packet duration operating time is on the order of a few line trace times of a conventional TV signal (63.5 $\mu$sec.).

It thus can be seen that no significant energy passes from terminals 65 to 54 unless a remote control signal has activated gate 66 for a period of time sufficiently long to permit the transmission of the upstream data packet. Also, it can be seen that both the first and second low pass filters 48' and 48 are properly terminated during both conduction modes of gate 66.

An additional way to further reduce the effects of ingress noise in TV cable systems, relevant to the present invention, is to send the upstream signal from cable modem 34 via drop cable 24 at a maximum signal level and then to attenuate the upstream signal prior to being transferred to the shared bidirectional TV cable subsystem 38. When this option is employed, unwanted noise will be reduced by the same amount as the attenuation applied. However, if the attenuator is placed in series with drop cable 24 both the upstream and the downstream signals would both be attenuated, which is to be avoided. However, since the upstream and downstream signals are isolated from each other in ingress noise blocker 45 through switch section 46 and high pass filter section 47, respectively, as seen in FIG. 4, a selectable attenuator 53 can optionally be inserted serially between first and second low pass filters 48' and 48 to affect only the upstream signal. There are several alternative locations where such an attenuator can be added. One is the serial location shown in FIG. 4, and another location would be in series with the 10 ohm impedance in the 10/680/680 ohm pi network of gate 66 (see FIGS. 6 and 7).

Figure 20:
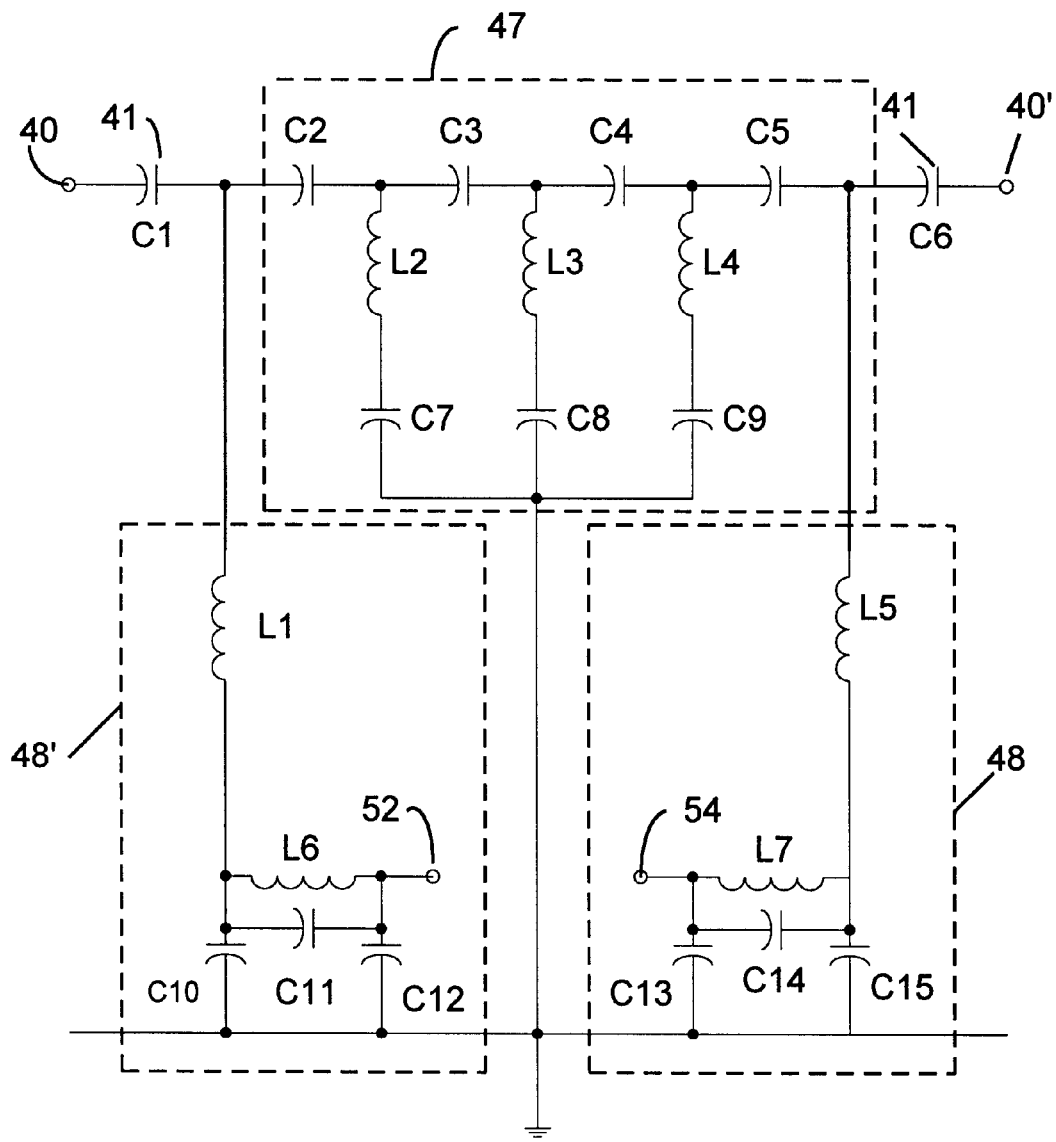
FIG. 20 is a detailed schematic diagram of the high and low pass filter sections of FIG. 4.

In FIG. 20 an element level schematic diagram of one embodiment of the high pass filter 47 and the two low pass filter sections 48 of the ingress noise blocker of the present invention is presented. Table I gives typical element values for the various inductors and capacitors in that schematic which result in the performance curves discussed below with respect to FIGS. 8 through 12.

TABLE I

Typical Element Values for Filter Circuit of FIG. 20

| Capacitors | | Inductors | |
|---|---|---|---|
| C1 | .01 mfd | L1 | 390 nH |
| C2 | 36 pfd | L2 | 150 nH |
| C3 | 36 pfd | L3 | 220 nH |
| C4 | 47 pfd | L4 | 330 nH |
| C5 | 51 pfd | L5 | 390 nH |
| C6 | .01 mfd | L6 | 220 nH |
| C7 | 240 pfd | L7 | 220 nH |
| C8 | 75 pfd | | |
| C9 | 43 pfd | | |
| C10 | 75 pfd | | |
| C11 | 33 pfd | | |
| C12 | 33 pfd | | |
| C13 | 33 pfd | | |
| C14 | 33 pfd | | |
| C15 | 75 pfd | | |

To enable visualization of the circuit elements shown here with the blocks in FIG. 4, the corresponding elements have been enclosed within broken lines and identified with the same reference numbers used in FIG. 4, as well as the circuit diagram having been laid out in the same configuration. Thus, along the top of FIG. 19 there is high pass filter 47 between terminals 40 and 40' with a serial DC blocking capacitor at each terminal. In the lower portion of FIG. 19 are the two low pass filter sections 48 and 48' each having a series inductor extending upward to also connect with a different DC blocking capacitors 41. Intermediate each of low pass filter sections 48 and 48' in the lower path are two terminals labeled 52 and 54 which correspond to the lines with the same reference numbers in FIG. 4 between which remotely operable attenuating device 50 is connected.

Figure 8:
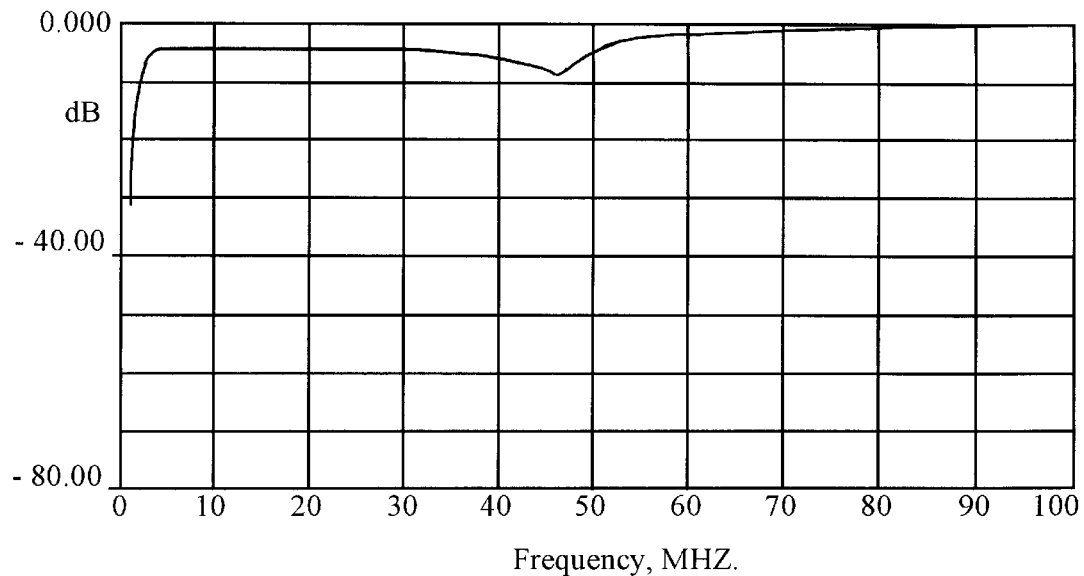
FIG. 8 is a graph showing the attenuation in dB of the ingress noise blocker of the embodiment of FIGS. 4 through 7 with the switch conducting to allow passage of upstream signals.
Figure 9:
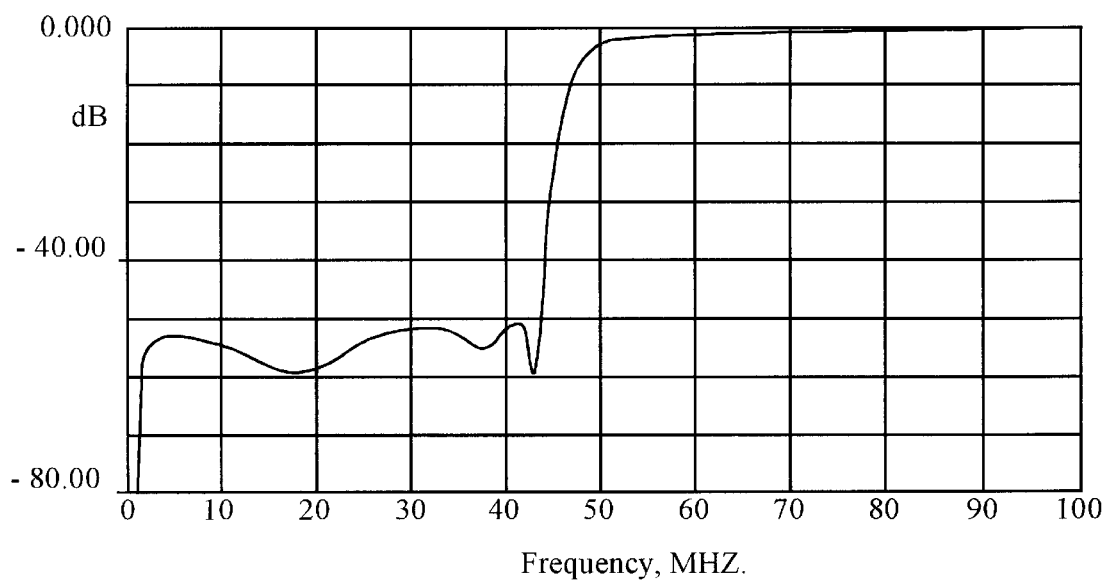
FIG. 9 is a graph as in FIG. 8 with the switch non-conductive, thus not allowing the passage of upstream signals.

In FIGS. 8 through 12, the modeled performance of noise ingress blocker 45 of FIGS. 4 through 7 and 19 is illustrated graphically. In FIGS. 8 and 9 the overall signal rejection is illustrated over 0 Hz to 100 MHz frequency range to focus on the performance at two specific frequencies, namely, 42 and 54 MHz—the top of the TV cable upstream band and the bottom of the TV band. In FIG. 8 the overall response in dB is shown with switch 50 (gate 66 conductive) closed completing the circuit of the switch section 46 of ingress noise blocker 45. The rejection in the upstream frequency range (low pass range) is only about 3 dB, whereas, the rejection in the downstream frequency range (high pass range), is on the order of 1 dB. The scale of the signal strength in the graphs of FIGS. 8 through 12 is 10 dB per division.

Similarly in FIG. 9 the overall response is shown with switch 50 (gate 66 non-conductive) open in switch section 46 with the rejection in the upstream frequency range (low pass range) being between 50 dB and 60 dB. Additionally, the rejection in the downstream frequency range (high pass range) remains on the order of 1 dB or less.

From FIGS. 8 and 9 several observations can be made. One is that there is little or no effect on the high frequency downstream signals presented by switching the lower frequency upstream signals in the low pass path section of ingress noise blocker 45. Whether or not the low pass path is conductive or non-conductive (i.e, since the signal rejection in the downstream band is substantially equal whether gate 66 is conductive or non-conductive) there is no visible impairment of the downstream TV signals. Another observation is that when the low pass section is not conductive there is sufficient rejection to permit the use of more bandwidth efficient modulation in the upstream direction. That in turn means that the cable system can accommodate many more upstream subscribers on the same feeder cable.

Figure 10:
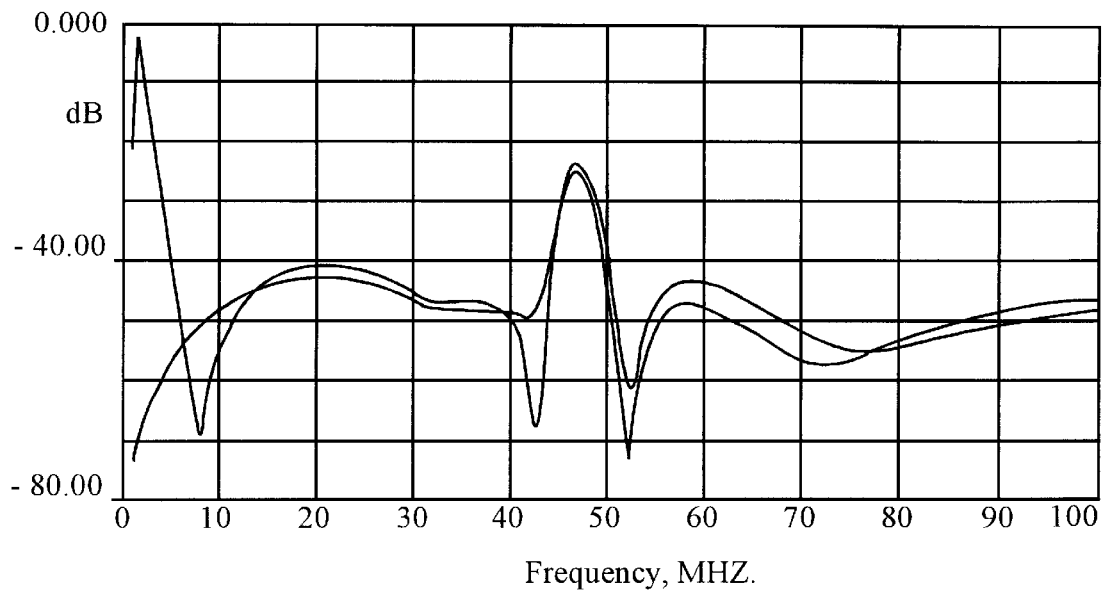
FIG. 10 is a graph showing the return loss in dB of the ingress noise blocker with the switch non-conductive, thus blocking the upstream signals. Two separate curves are shown: one measured at the input terminals and the other highly similar curve at the output terminals.
Figure 11:
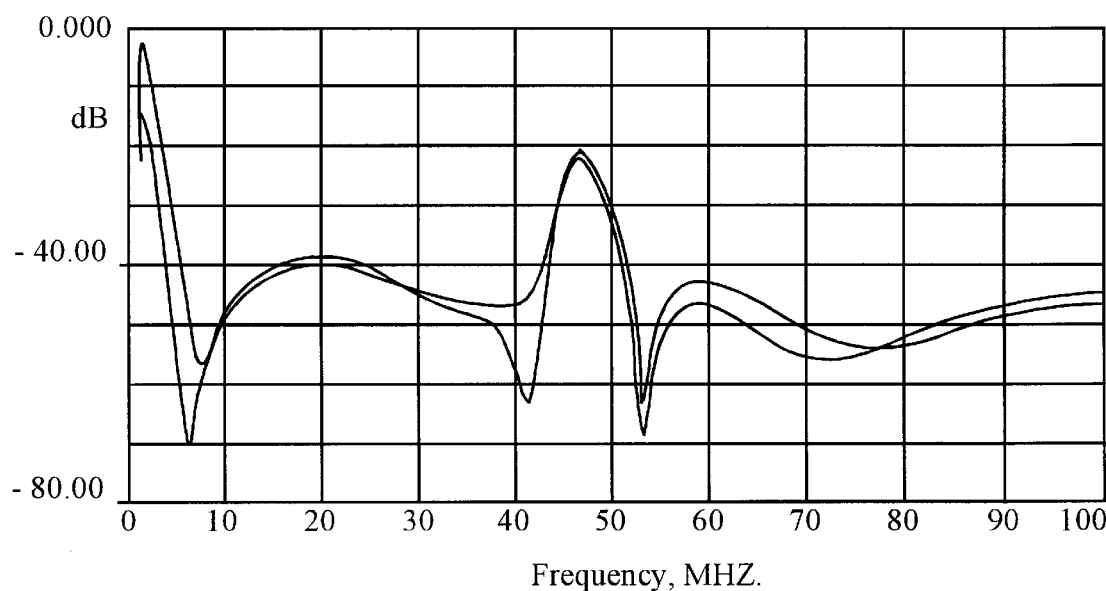
FIG. 11 is a graph as in FIG. 10 with the switch conducting, allowing the passage of upstream signals.
Figure 12:
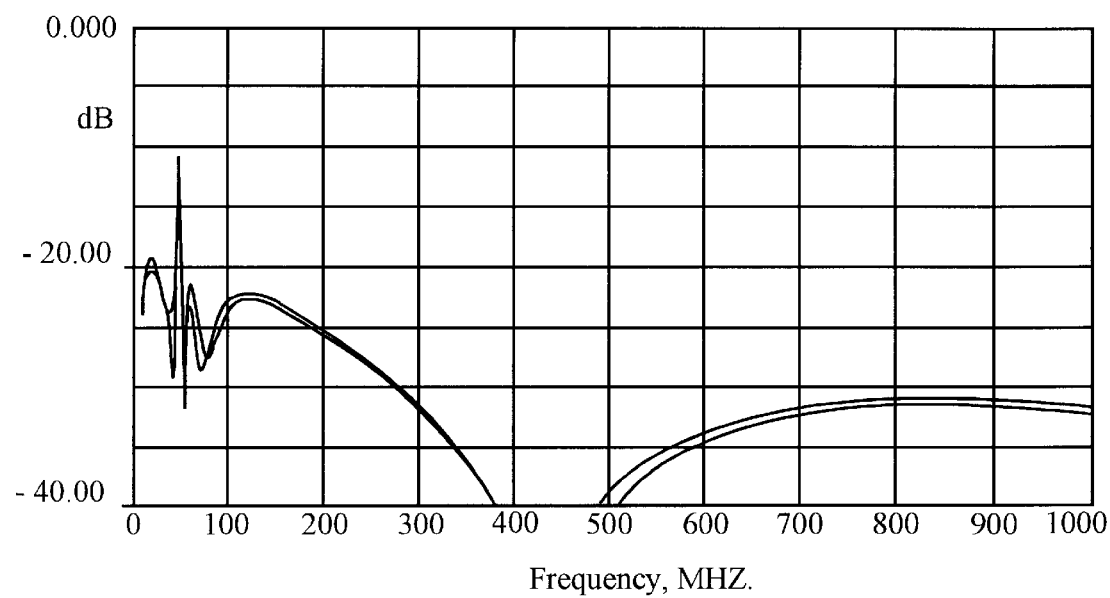
FIG. 12 is a graph of the return loss as in FIG. 10 shown over an extended frequency range of from 100 MHz to 1,000 MHz.

In FIGS. 10 through 12, an additional performance requirement of ingress noise blocker 45 is examined. In each of FIGS. 10 through 12 the reflected signal suppression (return loss) of the constant impedance gate 66 (see FIG. 5) with respect to frequency is shown. The curves in FIG. 10 were modeled with gate 66 conducting, and in each of FIGS. 11 and 12 gate 66 is non-conductive. One of the two separate curves shown is for measurements at the input terminals and the other the output terminals of ingress noise blocker 65. Within the two bands of interest (5–42 MHz and 54–550 MHz, the return loss is an excellent minimum of 20 dB. The fact that the return loss levels are substantially the same when gate 66 is both conductive and non-conductive is an indication as to how close the impedance of gate 66 matches the impedance of the overall system in each of those two states—a condition necessary for maintaining good digital data communications performance.

Next, FIG. 13 is provided to illustrate a low cost approach to the incorporation of the ingress noise blockers of the present invention in the operation of a TV cable system.

While FIG. 13 may look similar to FIG. 3, it differs in that in FIG. 13 each of the subscribers connected to the representative tap 20 is individually shown with either a simple high pass filter 44 or an ingress noise blocker 45 of the present invention. For subscribers that have purchased only downstream TV service (the outside connections in this illustration), filter 44 in series between tap 20 and drop cable 24 (for convenience only one drop cable 24 is shown in this illustration, however in actual operation there would be a separate drop cable to each subscriber) is only a high pass filter 44 shown here with a four-pointed star. For those subscribers that have also purchased upstream services, there would instead be an ingress noise blocker 45, in a cylindrical package, marked here with a five pointed star (two inside connections in this illustration), in series between tap 20 and the drop cable 24. The physical size and shape of ingress noise blocker 45 can be the same size as the conventional cylindrical high pass filter 44. This arrangement is desirable since upstream noise can originate in any subscriber's facility, whether or not the subscriber has purchased the services available with upstream transmission capability, additionally conventional high pass filters 44 are less expensive than ingress noise blockers 45 of the same configuration.

FIGS. 14a and 14b are timing diagrams that illustrate two different signals (voltage versus time) used in the present invention. FIG. 14a illustrates the time duration of an upstream transmitted packet time interval of approximately 250 μsec. in length. FIG. 14b is shown in time alignment with FIG. 14a to illustrate the periods of time that gate 66 must be conductive (i.e., the duration of the remote control tone—the sum of the period for the preceding initiation of switching of approximately 50 μsec. and the duration of the transmitted packet of approximately 250 μsec.) for a combined time of approximately 300 μsec. The main reason for requiring the start of the remote control signal ahead of the packet signal to be transmitted is that resonant circuit 58 (see FIG. 5) has a high Q that requires time before the 1 MHz tone signal generates a maximum output signal applied to rectifier 60.

Figure 15:
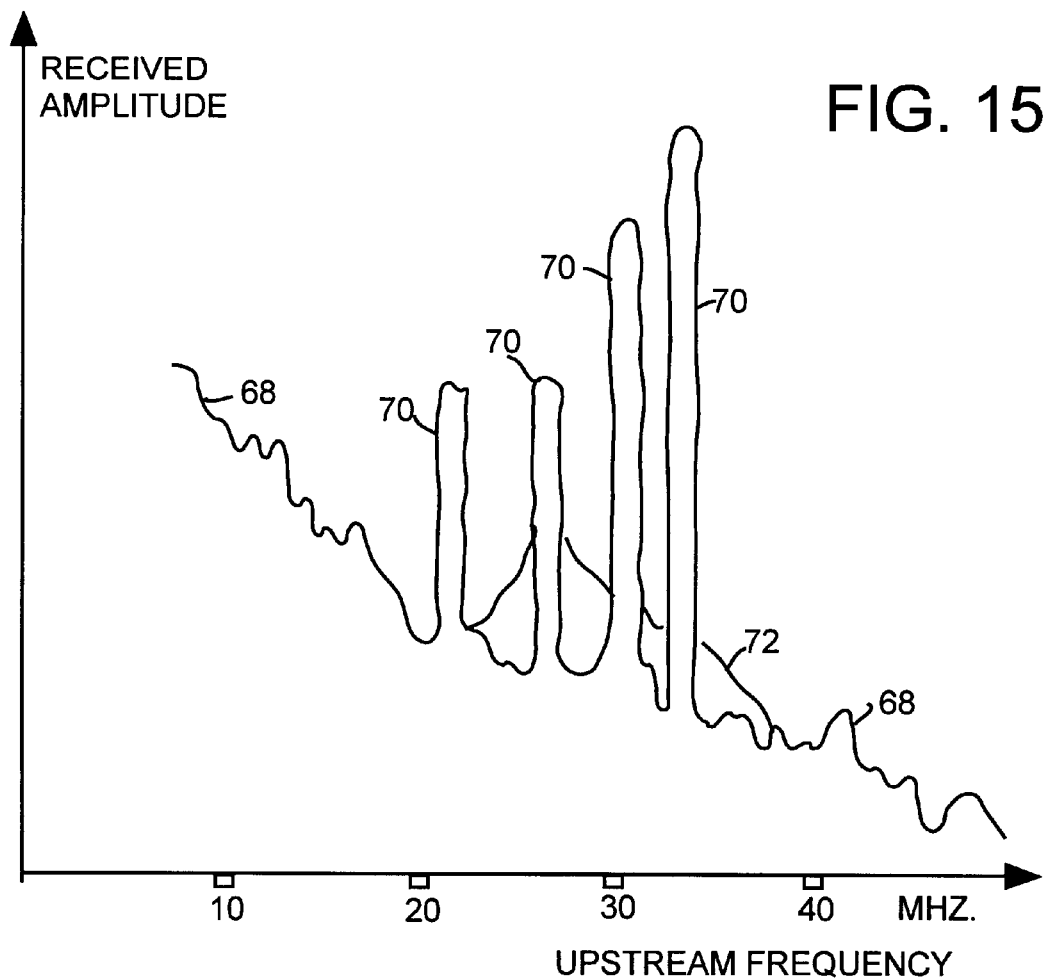
FIG. 15 is an amplitude versus frequency curve showing how the incremental noise addition caused at various subscriber's facilities is used to locate the source of ingress noise.

Next, FIG. 15 is included to illustrate the relative potential intensity of upstream noise from various sources given a point of ingress of the various noises in the upstream frequency range of 5 MHz to 42 MHz. Here, signals received at the headend are seen in an amplitude versus frequency display. General background noise 68 occurs across the band due to cable system internal losses and sources with the intensity of this noise tending to drop off in most TV cable systems as frequency increases. Upstream carrier signals 70 are the various subscriber upstream signals. Intermittent noise 72 has sources that are generally localized and from one or more subscriber facility. By correlating this noise with a priori knowledge of which subscriber is authorized to transmit upstream when noise 72 occurs permits pinpointing the source of that noise. Noise 72 that originates within a subscriber's facility tends to be transitory thus presenting a major diagnostics problem for TV cable systems, and that the present invention seeks to minimize.

Another feature of the present invention is the automation of the process to specifically identify which subscriber is the source of noise 68. FIG. 16 is a block diagram of the portion of the overall TV cable system used by the present invention to pinpoint the subscriber terminal unit (STU) that is the source of ingress noise 72.

FIG. 16 is a simplified block diagram of the TV cable system seen as a whole. The bottom block represents equipment at head end 12. Data 78 to be transmitted downstream is shown to be generated locally in this simplified drawing while in practice it would likely come from an external source. Data 78 is sent via downstream transmitter 80 on shared bidirectional TV cable subsystem 38, more specifically via feeder cable 16 and thence to ingress noise blocker 45 and through a drop cable to the subscriber's facility. At the subscriber's facility, the downstream signal is split off with high pass filter 82 from which some of the signal goes to TV sets, and some to data receiver 84, in the subscriber's data modem. The received data 86 is sent to microcontroller 88 and then is available for multiple purposes. Some data is used for internal control of the modem, for example, commands to change the frequency of transmitter 94. Another representative command might be an authorization to transmit, based in part on information in a buffer 90 holding data to be sent and an incoming authorization message from headend 12. In this case, microcontroller 88 sends out a signal first turning on the remote control signal generator 92. After a short delay then the data from buffer 90 is fed to transmitter 94 with a remote control signal preceding the data transmission assuring that the switching function of ingress noise blocker 45 is properly performed prior to receipt of the date.

As discussed above, in some TV cable systems subscribers transmit upstream on a shared frequency only when an authorization signal is issued from headend 12. The reason this is done is to prevent two or more signals of the same frequency from different subscribers being sent at the same time from interfering with each other.

At headend 12 the upstream signal is received by receiver 100 with the received data 102 sent to signal processing for further disposition. Simultaneously, the received upstream signal is also received by receiver 104 and processed to determine the presence of noise 72 (blocks 104, 74 and 108) before being transmitted to a system data base for further consideration. In addition to diagnosing the upstream signal and identifying the source of any noise present, the diagnosis is conducted knowing the subscriber terminal unit (STU) that is the source of the upstream signal since headend 12 authorized the transmission and retained the STU identity at block 76. Thus, if it is determined that noise 72 in the received upstream signal occurred during the authorized time period that the upstream signal from that STU was being sent, then that STU is the source of the noise. This identification information can then be used to dispatch technicians to identify and eliminate the noise source, or perhaps in the case of a troublesome STU, instruct the STU table (authorized to transmit) 76 not to authorize upstream transmissions from that STU until the problem has been resolved.

The processing function takes place in processor 74 which keeps a record of each STU versus each of a range of frequencies that they were authorized to transmit upstream using. The operation performed is to seek a correlation between a particular STU being authorized to transmit and an increase in noise 72 at another frequency at the same time. This is a statistical function and requires taking measurements over many time periods to avoid false correlations. Two separate signals, 201 and 202, are shown going to a diagnostics management center 109, having information about the performance of each STU in the system. Signal 201 indicates no correlation and signal 202 conveys correlations. In practice, the diagnostic management data center 110 would communicate with a system data base (not shown).

Figure 17:
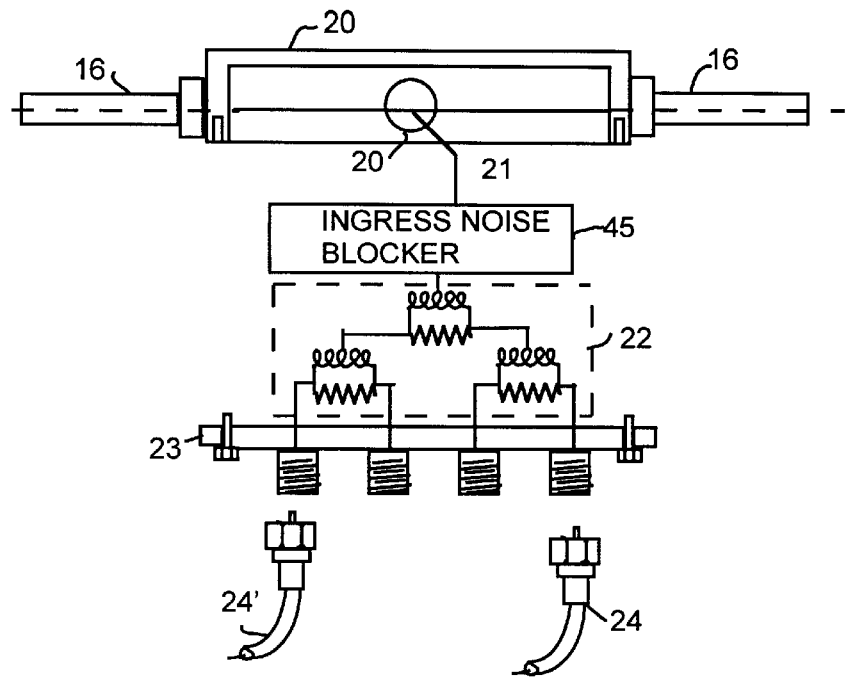
FIG. 17 is a partially exploded view of a feeder tap of a TV cable system with ingress noise blockers of the present invention incorporated thereinto.

FIG. 17 is a partially exploded block diagram of a feeder tap 20 with a noise ingress blocker 45 of the present invention connected between a tap 21 and a four-way-splitter 22 with ingress noise blocker 45 and splitter 22 both physically attached to connector base plate 23. In this example it should be understood that four connectors and four-way-splitter 22 are shown simply for convenience and that the actual number may vary in actual installations with no loss in the functioning or concept of the functioning. It should be further noted that since each subscriber modem may be set to send an upstream signal at a different frequency, the embodiment shown here can be used even with all of the subscribers sending upstream signals at the same time. The objective here is to reduce costs by sharing a single ingress noise blocker 45 over four subscriber facilities instead of having a separate ingress noise blocker for each one as described earlier. Additionally, if any subscriber connected to tap 20 has not subscribed to the upstream option, that subscriber will not lose any performance since switching noise has been designed out of ingress noise blocker 45; to such a subscriber ingress noise blocker 45 will be transparent.

Figure 18:
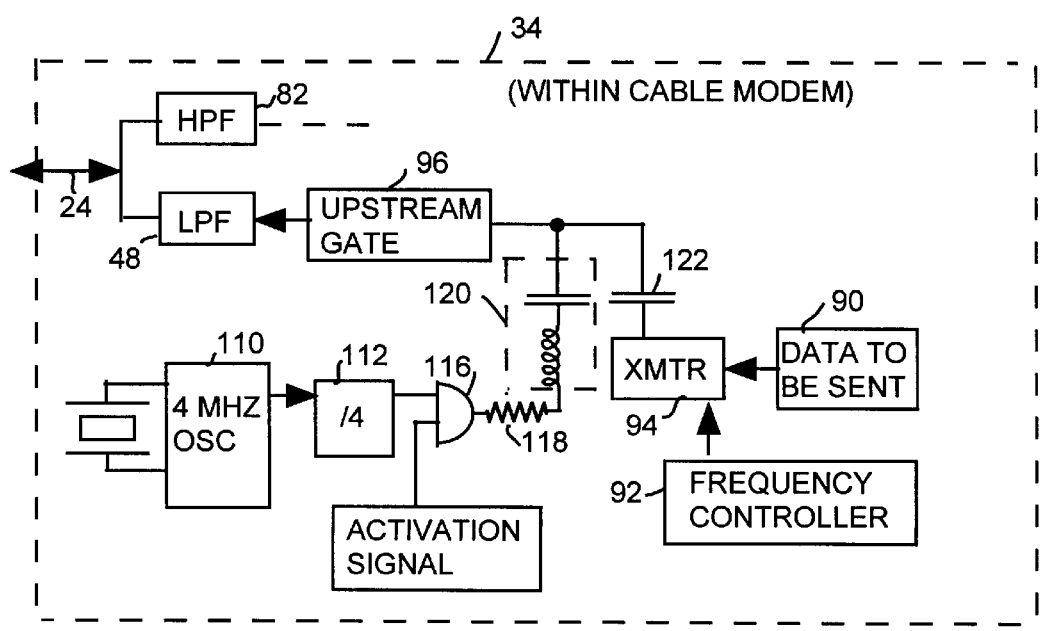
FIG. 18 is a schematic diagram illustrating the insertion of the remote control signal that precedes a data packet being transmitted upstream from a subscriber's facility.

FIG. 18 is a block diagram of a portion of subscriber's facility 26 within the cable modem from FIG. 16 to add components to implement the incorporation of the remote control signal preceding the upstream signal.

One embodiment to add a remote control signal to the upstream signal includes transmitter 94, under the control of frequency controller 92, shown with data 90 to be sent upstream being applied to transmitter 94. In series with the output line from transmitter 94, capacitor 122 combines a lower frequency tone with the signal from transmitter 94. The 1 MHz tone, with low even harmonics, is generated from a 4 MHz oscillator 110 with the 4 MHz signal divided by a factor of four resulting in the output signal from divider 112 being a 1 MHz square wave signal. The resultant square wave 1 MHz signal is next applied to one input terminal of RF gate 116 with the 1 MHz signal passing from gate 116 when the activation signal from microcontroller 88 in FIG. 16 is enabled. The duration of the 1 MHz signal tone added to the upstream signal is determined by the microcontroller 88 in FIG. 16.

In series with the output terminal of gate 116 is a 75 Ω impedance matching resistor 118 and a tuned circuit 120, tuned to the 1 MHz frequency of the desired tone. Tuned circuit 120 in turn is connected to the input terminal of upstream gate 96, as is DC blocking capacitor 122. Under control of the micro-controller 88, or equivalent, a 1 MHz tone of approximately 300 μsec. in duration is added to proceed, and to last throughout, transmission of the upstream packet.

Referring next to FIG. 19, and comparing that figure with FIG. 18, it can be seen that the two schematics are substantially the same. There are two differences, one is that in FIG. 19 a DC voltage is being applied to gate 116, instead of the 1 MHz AC tone shown in FIG. 18. The second difference is the removal of the capacitor in the series tuned circuit 120 of FIG. 18. The inclusion of FIG. 19 is to illustrate the possibility of using other forms of remote control signals for the ingress noise blocker of the present invention, other than a 1 MHz tone.

The following definitions are offered to ensure that the terms used in the claims are well established:

"bidirectional TV cable system":
a system comprised of two subsystems, a subscriber subsystem and a shared bidirectional transmission system, where one or more frequencies below 50 MHz is used for upstream transmission and one or more frequencies above 50 MHz is used for downstream transmission.

"downstream":
  that direction of transmission away from the cable head end toward the subscriber's facilities.

Downstream signals are generally TV video images and digital signals on rf carriers.

"ingress noise blocker":
  a normally open switch or attenuator blocking the transmission of upstream energy in a bidirectional TV cable system, except during the interval following receipt of a remote control signal. (42)

"remote control signal":
  a signal emanating from a cable modem or other device at the subscriber's facility to remotely activate an ingress noise blocker.

"remotely operable attenuation device":
  the switching portion of the ingress noise blocker activated by the remote control signal. The remotely operable attenuation device supports a switching function that maintains an impedance match to avoid line reflection and loss of transmission quality.

"shared bidirectional subsystem":
  the well shielded and ingress protected bidirectional transmission path to and from a cable headend including taps, feeder cable and optionally, fiber cable.

"subscriber subsystem":
  a subsystem comprising one or more devices in a subscriber's facility and their connected cables and splitters.

"upstream":
  that direction of transmission from the subscriber facilities to the cable head end. Upstream signals are generally subscriber generated data signals on rf carriers.

"visible switching artifact":
  visible impairments to downstream TV images caused by transients generated by the switching function within the ingress noise blocker.

While the ingress noise filter of the present invention in the preferred embodiment has been discussed as being located in series with the drop cable of a single subscriber, the same ingress noise filter could be employed at any point in the TV cable, for example any of locations A, B, C, D, E, F, G and H shown in FIG. 1. One skilled in the art is therefore free to locate an ingress noise filter of the present invention at the location where they deem optimum performance will be achieved given the specific system configuration of that they have to deal with.

Although the descriptions above primarily discuss the use of present generation implementation techniques, some specific technologies involved in the preferred embodiments of the present invention are expected to change as time evolves. Further, as will be understood by those familiar with the art, the present invention may be embodied in other specific forms without departing form the spirit or essential characteristics thereof. The scope of the present invention therefore in its full interpretation is only to be limited by the scope of the claims appended hereto.

What is claimed is:

1. A subscriber subsystem for use with a cable TV system, said cable TV system having a headend from which downstream signal emanates and to which an upstream signal is directed and a shared bidirectional subsystem connected to said headend and extending downstream therefrom to conduct both downstream and upstream signals, said downstream signal being in a first band and said upstream signal being in a lower second band wherein the lowest frequency of said first band is higher than the highest frequency of said second band, said subscriber subsystem connected to said shared bidirectional subsystem downstream from said headend to receive said downstream signal and to add a user initiated upstream signal to said shared bidirectional subsystem, said subscriber subsystem comprising:

a drop cable connected to said shared bidirectional subsystem and extending downstream therefrom;

an ingress noise blocker serially connected with said drop cable at a selected point there along, said ingress noise blocker having:
    a first high pass filter having a cut-off frequency that is lower than said lowest frequency of said first band and higher than said highest frequency of said second band to pass said downstream signal and block said upstream signal; and
    a bypass section connected in parallel across said first high pass filter, said bypass section including:
      a pair of low pass filters each having a cut-off frequency that is lower than said lowest frequency of said first band, higher than said highest frequency of said second band, and lower than said cut-off frequency of said first high pass filter to pass said upstream signal and to block the transmission of visible switching noise artifacts and said downstream signal; and
      a remotely operable attenuator serially connected intermediate said pair of low pass filters to pass upstream signals following receipt of a remote control signal; and a subscriber facility connected to a downstream end of said drop cable to receive said downstream signal therefrom, to generate and present said upstream signal to said drop cable, and to generate and apply said remote control signal to said drop cable to activate said remotely operable attenuator prior to presenting said upstream signal to said drop cable;

wherein said remote control signal has a frequency that is lower than the lowest frequency of said second band, begins before said upstream signal is presented to said drop cable and lasts at least until said upstream signal terminates.

2. A subscriber subsystem as in claim 1 wherein:
  said subscriber facility includes:
    an upstream signal generator responsive to user supplied data to be transmitted upstream;
    a remote control signal generator to generate said remote control signal;
    a signal adder coupled to said upstream signal generator and said remote control signal generator to provide a combination of said upstream signal and said remote control signal to said drop cable;
    a trigger circuit coupled to said upstream signal generator and said remote control signal generator to trigger said remote control signal generator and said adder to begin applying said remote control signal to said drop cable a preselected period of time prior to applying said upstream signal to said drop cable when said upstream signal generator generates an upstream signal; and
  said remotely operable attenuator includes a detector to monitor said remote control signal and to activate said remotely operable attenuator when said remote control signal is detected to permit transients in said remotely operable attenuator to settle out prior to receipt of said upstream signal and to maintain said remotely operable attenuator active for the duration of said upstream signal.

3. A subscriber subsystem as in claim 2 wherein said remote control signal generator is a tone generator and said remote control signal is a tone having a frequency that is lower than said lowest frequency of said second band.

4. A subscriber subsystem as in claim 3 wherein:

said detector of said remotely operable attenuator is a tone detector, said tone detector includes:

a tuned series resonate circuit connected between one of said pair of low pass filters closest to said subscriber facility and a signal return including a series connected capacitor and inductor with an intermediate junction therebetween; and a rectifier circuit coupled to said intermediate junction of said tuned series resonate circuit to generate a DC power signal from said tone received from said subscriber facility; and said remotely operable attenuator further includes:

a second high pass filter having a first end and a second end with said second end connected the same one of said pair of low pass filters to which said tuned series resonate circuit is connected, and having a cut-off frequency that is lower than said lowest frequency of said second band and higher than said frequency of said tone; and an externally powered constant impedance gate circuit coupled to said first end of said second high pass filter to receive said upstream signal, and connected to said rectifier circuit to receive operating power therefrom.

5. A subscriber subsystem as in claim 4 wherein said constant impedance gate includes:

a first resistive element of a first selected impedance having a first end and second end, with said first end coupled to said first end of said second high pass filter;

a second resistive element of a second selected impedance having a first end and a second end with said first end coupled to said second end of said first resistive element;

a third resistive element of said first selected impedance having a first end and a second end with said first end coupled to said second end of said second resistive element and said second end coupled to the one of said low pass filters that is coupled to said drop cable in the upstream direction;

a fourth resistive element of a third selected impedance having a first end and second end with said first end coupled to said second end of said first resistive element and said second end coupled to said signal return;

a fifth resistive element of said third impedance having a first end and second end with said first end coupled to said first end of said third resistive element and said second end coupled to said signal return;

a first switching element connected across said first resistive element being normally open and closing when power is received from said rectifier circuit;

a second powered switching element connected across said third resistive element being normally open and closing when power is received from said rectifier circuit;

a third powered switching element connected across said fourth resistive element being normally closed and opening when power is received from said rectifier circuit; and a fourth powered switching element connected across said fifth resistive element being normally closed and opening when power is received from said rectifier circuit;

wherein said second selected impedance is lower than said first selected impedance, and said first selected impedance is lower than said third selected impedance.

6. A subscriber subsystem as in claim 5 wherein:

said first selected impedance is 75 ohms;

said second selected impedance is 10 ohms; and said third impedance is 680 ohms.

7. A subscriber subsystem as in claim 2 wherein said lowest frequency of said second band is 5 MHZ and said frequency of said tone is 1 MHZ.

8. A subscriber subsystem as in claim 1 wherein said ingress noise blocker is located at the junction of, and between, said shared bidirectional subsystem and said drop cable.

9. A subscriber subsystem as in claim 1 wherein said remotely operable attenuator includes:

a signal detector coupled to one of said pair of low pass filters closest to said subscriber facility to detect said remote control signal and to generate a power signal from said remote control signal; and a constant impedance gate coupled to the same one of said pair of low pass filters coupled to said signal detector to receive said upstream signal from said subscriber facility and coupled to said signal detector to receive operational power therefrom, said constant impedance gate having:

a first selected impedance having a first end and second end, with said first end coupled to said first end of said first low pass filter;

a second resistive element of a second selected impedance having a first end and a second end with said first end coupled to said second end of said first resistive element;

a third resistive element of said first selected impedance having a first end and a second end with said first end coupled to said second end of said second resistive element and said second end coupled to said drop cable in the upstream direction;

a fourth resistive element of a third selected impedance having a first end and second end with said first end coupled to said second end of said first resistive element and said second end coupled to said signal return;

a fifth resistive element of said third impedance having a first end and second end with said first end coupled to said first end of said third resistive element and said second end coupled to said signal return;

a first switching element connected across said first resistive element being normally open and closing when a power signal is received from said signal detector;

a second powered switching element connected across said third resistive element being normally open and closing when said power signal is received from said signal detector;

a third powered switching element connected across said fourth resistive element being normally closed and opening when said power signal is received from said signal detector; and a fourth powered switching element connected across said fifth resistive element being normally closed and opening when said power signal is received from said signal detector;

wherein said second selected impedance is lower than said first selected impedance, and said first selected impedance is lower than said third selected impedance.

10. A subscriber subsystem as in claim 9 wherein:
said first selected impedance is 75 ohms;
said second selected impedance is 10 ohms; and
said third impedance is 680 ohms.

11. A subscriber subsystem as in claim 2 wherein said remote control signal generator is a DC generator and said remote control signal is a DC level.

12. A subscriber subsystem as in claim 11 wherein:
said detector of said remotely operable attenuator is a DC voltage level detector connected between one of said pair of low pass filters closest to said subscriber facility and a signal return to monitor said remote control signal for a DC voltage level greater than a present threshold value; and
said remotely operable attenuator further includes:
a second high pass filter having a first end and a second end with said second end connected to said first end of said first low pass filter, and having a cut-off frequency that is lower than said lowest frequency of said second band; and
an externally powered constant impedance gate circuit coupled to said first end of said second high pass filter to receive said upstream signal, and connected to said DC voltage level detector to receive operating power therefrom when said DC voltage level exceeds said preset threshold.

13. A subscriber subsystem as in claim 12 wherein said constant impedance gate includes:
a first resistive element of a first selected impedance having a first end and second end, with said first end coupled to said first end of said second high pass filter;
a second resistive element of a second selected impedance having a first end and a second end with said first end coupled to said second end of said first resistive element;
a third resistive element of said first selected impedance having a first end and a second end with said first end coupled to said second end of said second resistive element and said second end coupled to said drop cable in the upstream direction;
a fourth resistive element of a third selected impedance having a first end and second end with said first end coupled to said second end of said first resistive element and said second end coupled to said signal return;
a fifth resistive element of said third impedance having a first end and second end with said first end coupled to said first end of said third resistive element and said second end coupled to said signal return;
a first switching element connected across said first resistive element being normally open and closing when power is received from said DC voltage level detector;
a second powered switching element connected across said third resistive element being normally open and closing when power is received from said DC voltage level detector;
a third powered switching element connected across said fourth resistive element being normally closed and opening when power is received from said DC voltage level detector; and
a fourth powered switching element connected across said fifth resistive element being normally closed and opening when power is received from said DC voltage level detector;

wherein said second selected impedance is lower than said first selected impedance, and said first selected impedance is lower than said third selected impedance.

14. A subscriber subsystem as in claim 13 wherein:
said first selected impedance is 75 ohms;
said second selected impedance is 10 ohms; and
said third impedance is 680 ohms.

15. A subscriber subsystem as in claim 1 wherein said remotely operable attenuator has a response time that is less than the sweep time of a single TV horizontal line.

16. A subscriber subsystem as in claim 1 wherein said ingress noise blocker has a worst case return loss in excess of 14 dB in both an upstream frequency band and a downstream frequency band, as measured with said remotely operable attenuator conductive and non-conductive.

17. A subscriber subsystem as in claim 1 wherein said bypass section of said ingress noise blocker further includes a selectable upstream attenuator serial connected with said first low pass filter, said selectable upstream attenuator disposed to match an optimum signal level to be applied to said shared bidirectional subsystem and to further reduce ingress noise.

18. A subscriber subsystem as in claim 5 wherein said second resistive element is a selectable attenuator that is disposed to match an optimum signal level to be applied to said shared bidirectional subsystem and to further reduce ingress noise.

19. A subscriber subsystem as in claim 9 wherein said second resistive element is a selectable attenuator that is disposed to match an optimum signal level to be applied to said shared bidirectional subsystem and to further reduce ingress noise.

20. An ingress noise blocker to be used in a bidirectional TV cable system connected serially between a shared bidirectional subsystem and a subscriber subsystem, said subscriber subsystem generates and presents an upstream signal to said ingress noise blocker, and Generates and provides a remote control signal to said ingress noise blocker wherein said remote control signal has a frequency that is lower than any upstream or downstream signal and is provided to said ingress noise blocker before said upstream signal is presented to the ingress noise blocker, said ingress noise blocker comprising:
a high pass filter designed to pass downstream signals; and
a bypass section connected in parallel across said high pass filter, said bypass section including:
a low pass filter designed to pass upstream signals and block the transmission of visible switching artifacts; and
a remotely operable attenuator serially connected to said first low pass filter to pass upstream signals beginning a preselected period of time following receipt of said remote control signal from said subscriber subsystem to permit switching transitions to settle out before said upstream signal is received by said remotely operable attenuator, wherein said remotely operable attenuator further includes a gate section serially connected to said low pass filter and a DC voltage level detector with said gate section non-conductive when said DC voltage is below said preset threshold and conductive when said DC voltage exceeds said preset thresholds;
wherein:
said remote control signal is a DC voltage level; and
said DC voltage level detector monitors said remote control signal for a DC voltage level greater than a preset threshold.

21. An ingress noise blocker to be used in a bidirectional TV cable system connected serially between a shared bidirectional subsystem and a subscriber subsystem, said subscriber subsystem generates and presents an upstream signal to said ingress noise blocker, and generates and provides a remote control signal to said ingress noise blocker wherein said remote control signal has a frequency that is lower than any upstream or downstream signal and is provided to said ingress noise blocker before said upstream signal is presented to ingress noise blocker, said ingress noise blocker comprising:

a high pass filter designed to pass downstream signals; and a bypass section connected in parallel across said high pass filter, said bypass section including:

a low pass filter designed to pass upstream signals and block the transmission of visible switching artifacts; and a remotely operable attenuator serially connected to said first low pass filter to pass upstream signals beginning a preselected period of time following receipt of said remote control signal from said subscriber subsystem to permit switching transitions to settle out before said upstream signal is received by said remotely operable attenuator, wherein said remotely operable attenuator includes:

a signal detector coupled to said low pass filter to detect said remote control signal and to generate a power signal from said remote control signal; and a constant impedance gate serially coupled to said low pass filter to receive said upstream signal from said subscriber facility and coupled to said signal detector to receive operational power therefrom, said constant impedance gate having:

a first selected impedance having a first end and second end, with said first end coupled to said low pass filter;

a second resistive element of a second selected impedance having a first end and a second end with said first end coupled to said second end of said first resistive element;

a third resistive element of said first selected impedance having a first end and a second end with said first end coupled to said second end of said second resistive element and said second end coupled to said drop cable in the upstream direction;

a fourth resistive element of a third selected impedance having a first end and second end with said first end coupled to said second end of said first resistive element and said second end coupled to said signal return;

a fifth resistive element of said third impedance having a first end and second end with said first end coupled to said first end of said third resistive element and said second end coupled to said signal return;

a first switching element connected across said first resistive element being normally open and closing when a power signal is received from said signal detector;

a second powered switching element connected across said third resistive element being normally open and closing when said power signal is received from said signal detector;

a third powered switching element connected across said fourth resistive element being normally closed and opening when said power signal is received from said signal detector; and a fourth powered switching element connected across said fifth resistive element being normally closed and opening when said power signal is received from said signal detector;

wherein said second selected impedance is lower than said first selected impedance, and said first selected impedance is lower than said third selected impedance.

22. An ingress noise blocker as in claim 21 wherein:

said first selected impedance is 75 ohms;

said second selected impedance is 10 ohms; and said third impedance is 680 ohms.

23. An ingress noise blocker as in claim 21 wherein said remote control signal generator is a tone generator and said remote control signal is a constant frequency tone.

24. An ingress noise blocker as in claim 21 wherein:

said signal detector is a tone detector, said tone detector including:

a tuned series resonate circuit connected between said low pass filter and a signal return including a series connected capacitor and inductor with an intermediate junction therebetween; and a rectifier circuit coupled to said intermediate junction of said tuned series resonate circuit to generate a DC power signal from said constant frequency tone received from said subscriber facility; and said remotely operable attenuator further including a second high pass filter having a first end and a second end with said second end connected to said low pass filter, and having a cut-off frequency that is lower than a lowest frequency of said upstream signal and higher than said constant frequency of said tone.

25. An ingress noise blocker as in claim 21 wherein:

said remote control signal generator is a DC generator and said remote control signal is a DC level; and said signal detector is a DC voltage threshold detector that generators said power signal as a DC voltage signal when said remote control signal exceeds a present DC threshold.

* * * * *